(12) United States Patent
Bender

(10) Patent No.: US 7,471,026 B2
(45) Date of Patent: Dec. 30, 2008

(54) BRUSHLESS ELECTRIC MOTOR

(75) Inventor: Lawrence F. Bender, Louisville, KY (US)

(73) Assignee: ISCA Innovatons, LLC, Louisville, KY (US)

( * ) Notice: Subject to any disclaimer, the term of this patent is extended or adjusted under 35 U.S.C. 154(b) by 506 days.

(21) Appl. No.: 11/373,938

(22) Filed: Mar. 13, 2006

(65) Prior Publication Data

US 2007/0210675 A1 Sep. 13, 2007

(51) Int. Cl.
*H02K 21/24* (2006.01)

(52) U.S. Cl. .................. 310/268; 310/208; 310/156.32

(58) Field of Classification Search ................. 310/268, 310/208, 156.32–156.37, 261, 266, 12
See application file for complete search history.

(56) References Cited

U.S. PATENT DOCUMENTS

| | | | |
|---|---|---|---|
| 3,700,944 A | 10/1972 | Heinz | |
| 3,790,835 A | 2/1974 | Takeda | |
| 3,988,024 A | 10/1976 | Watanabe et al. | |
| 4,068,143 A | 1/1978 | Whiteley | |
| 4,360,751 A * | 11/1982 | Arnold et al. ............. 310/60 R | |
| 4,361,776 A | 11/1982 | Hayashi et al. | |
| 4,371,801 A | 2/1983 | Richter | |
| 4,420,875 A | 12/1983 | Coquillart | |
| 4,551,645 A | 11/1985 | Takahashi et al. | |
| 4,682,065 A | 7/1987 | English et al. | |
| 4,743,813 A | 5/1988 | Tassinario | |
| 4,839,543 A | 6/1989 | Beakley et al. | |
| 4,841,204 A * | 6/1989 | Studer .................. 318/400.41 | |
| 5,146,144 A | 9/1992 | Lee | |
| 5,168,185 A | 12/1992 | Umehara et al. | |
| 5,268,607 A | 12/1993 | McManus | |
| 5,304,884 A | 4/1994 | Kitajima et al. | |
| 5,396,140 A | 3/1995 | Goldie et al. | |
| 5,397,953 A | 3/1995 | Cho | |
| 5,448,118 A | 9/1995 | Nakamura et al. | |
| 5,589,722 A | 12/1996 | Sakaguchi et al. | |
| 5,672,927 A * | 9/1997 | Viskochil ..................... 310/194 |
| 5,744,896 A | 4/1998 | Kessinger, Jr. et al. | |
| 5,789,841 A * | 8/1998 | Wang .......................... 310/179 |
| 5,806,169 A | 9/1998 | Trago et al. | |
| 6,020,661 A | 2/2000 | Trago et al. | |
| 6,040,647 A | 3/2000 | Brown et al. | |

(Continued)

FOREIGN PATENT DOCUMENTS

DE 103 11 818 A1 9/2004

(Continued)

*Primary Examiner*—Gary F. Paumen
(74) *Attorney, Agent, or Firm*—John R. Hoffman

(57) ABSTRACT

A brushless electric motor includes a housing with a pair of disc-shaped end plates fixed relative to the housing in a spaced, generally parallel relationship to each other. A pair of bearings are respectively positioned in the end discs. A motor shaft is rotatably journalled in the bearings for rotation about its axis. A stator assembly is supported by the housing intermediate the end plates and through which the motor shaft passes. The stator assembly includes a plurality of individual wire-wound coils in a toroidal array around the axis of the shaft. The stator assembly has recesses in opposite faces thereof. A pair of disc-shaped rotor assemblies are respectively disposed within the recesses in the opposite faces of the stator assembly inside the end plates.

49 Claims, 21 Drawing Sheets

U.S. PATENT DOCUMENTS

| | | |
|---|---|---|
| 6,359,355 B1 | 3/2002 | Hartsfield et al. |
| 6,368,530 B1 | 4/2002 | Adubato et al. |
| 6,492,751 B1 * | 12/2002 | Ineson et al. .................. 310/71 |
| 6,768,239 B1 | 7/2004 | Kelecy et al. |
| 6,856,063 B1 | 2/2005 | Kelecy et al. |
| 2001/0033111 A1 | 10/2001 | Choi |
| 2002/0195898 A1 * | 12/2002 | Ineson et al. ................ 310/190 |
| 2004/0012284 A1 | 1/2004 | Denton et al. |
| 2004/0135465 A1 | 7/2004 | Smith et al. |
| 2005/0180867 A1 | 8/2005 | Takahashi et al. |
| 2006/0043821 A1 | 3/2006 | Kojima et al. |

FOREIGN PATENT DOCUMENTS

| | | |
|---|---|---|
| EP | 1 292 004 A1 | 3/2003 |
| EP | 1 612 913 A2 | 1/2006 |
| GB | 2 379 093 A | 2/2003 |
| JP | 61001243 | 1/1986 |
| WO | WO 2004/042900 A1 | 5/2004 |

* cited by examiner

BRUSHLESS ELECTRIC MOTOR

FIELD OF THE INVENTION

This invention generally relates to the art of electric rotary machines and, particularly, to a brushless electric motor.

BACKGROUND OF THE INVENTION

Electric rotary machines, such as motors and generators, have been used for a wide variety of applications. For instance, in a typical flat brushless motor, a rotor is secured to a motor shaft for rotation adjacent to a stationary stator. The rotor has a plurality of separate and independent permanent magnets held together in an alternating north/south annular array. The stator includes a plurality of coils which are angularly spaced about the axis of the motor shaft and disposed axially of the rotor with an air gap therebetween. Such machines operate on the principle that current traveling in the stationary coils or windings of the stator produce a rotating magnetic field which, in turn, produces a current in the rotor which occupies the space where the rotating magnetic field exists. The induced current in the rotor reacts with the rotating magnetic field to produce a force. In other words, when the coils are energized, current flowing therethrough interact with magnetic flux from the permanent magnets to generate torque for rotating the motor shaft.

Such electric rotary machines continue to encounter problems due to their complexity of construction involving an unduly number of parts as well as their inefficiency. The present invention is directed to solving these problems by providing an extremely simple and efficient design of an electric motor.

SUMMARY OF THE INVENTION

An object, therefore, of the invention is to provide a new and improved brushless electric motor of the character described.

In the exemplary embodiment of the invention, the motor includes a housing, with a pair of end plates fixed relative to the housing in a spaced, generally parallel relationship to each other. A pair of bearings are respectively positioned in the end discs. A motor shaft is rotatably journalled in the bearings for rotation about its axis. A stator assembly is supported by the housing intermediate the end plates and through which the motor shaft passes. The stator assembly includes a plurality of individual wire-wound coils in a toroidal array around the axis of the shaft. The stator assembly has recesses in opposite faces thereof. A pair of disc-shaped rotor assemblies are respectively disposed within the recesses in the opposite faces of the stator assembly inside the end plates.

According to one aspect of the invention, the wire-wound coils of the stator assembly overlap each other in the toroidal array around the axis of the shaft. A plastic encasement is over-molded about the array of coils, with wires leads from the coils extending out of the encasement, and with the over-molded encasement having circular recesses in opposite faces thereof. The pair of end plates are disc-shaped and are secured to the opposite faces of the encasement.

According to another aspect of the invention, the pair of disc-shaped rotor assemblies are respectively disposed substantially entirely within the circular recesses in the opposite faces of the stator assembly. Each rotor assembly is laminated to include a magnet disc and a flux return disc secured to the magnet disc. The magnet disc is solid and of homogeneous metal material, with a plurality of permanent magnet sectors of alternating polarity incited directly into the solid metal material. The magnet disc is ring-shaped to provide a ring-like pattern of permanent magnet sectors. The return disc is fabricated of ferrous material.

According to a further aspect of the invention, the housing is fabricated of plastic material such as a thermosetting polyester resin. The plastic housing includes passage means for circulating lubricating or cooling fluid. The plastic housing may be impregnated with a fibrous reinforcing material. The plastic housing also may include at least one cavity for receiving control means for the motor.

The invention also contemplates a unique method of fabricating the stator assembly. Particularly, the assembly includes a coil-positioning boot on which the wire-wound coils are properly positioned and spaced. The boot may be fabricated of plastic material. The plastic encasement then is over-molded about the boot and the properly positioned and spaced coils, with the boot remaining within the encasement after overmolding. The boot also may include wire management portions for positioning individual wires extending between the wire-wound coils. In the exemplary embodiment, the boot also includes a plurality of positioning projections about which the wire-wound coils are positioned.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 11:
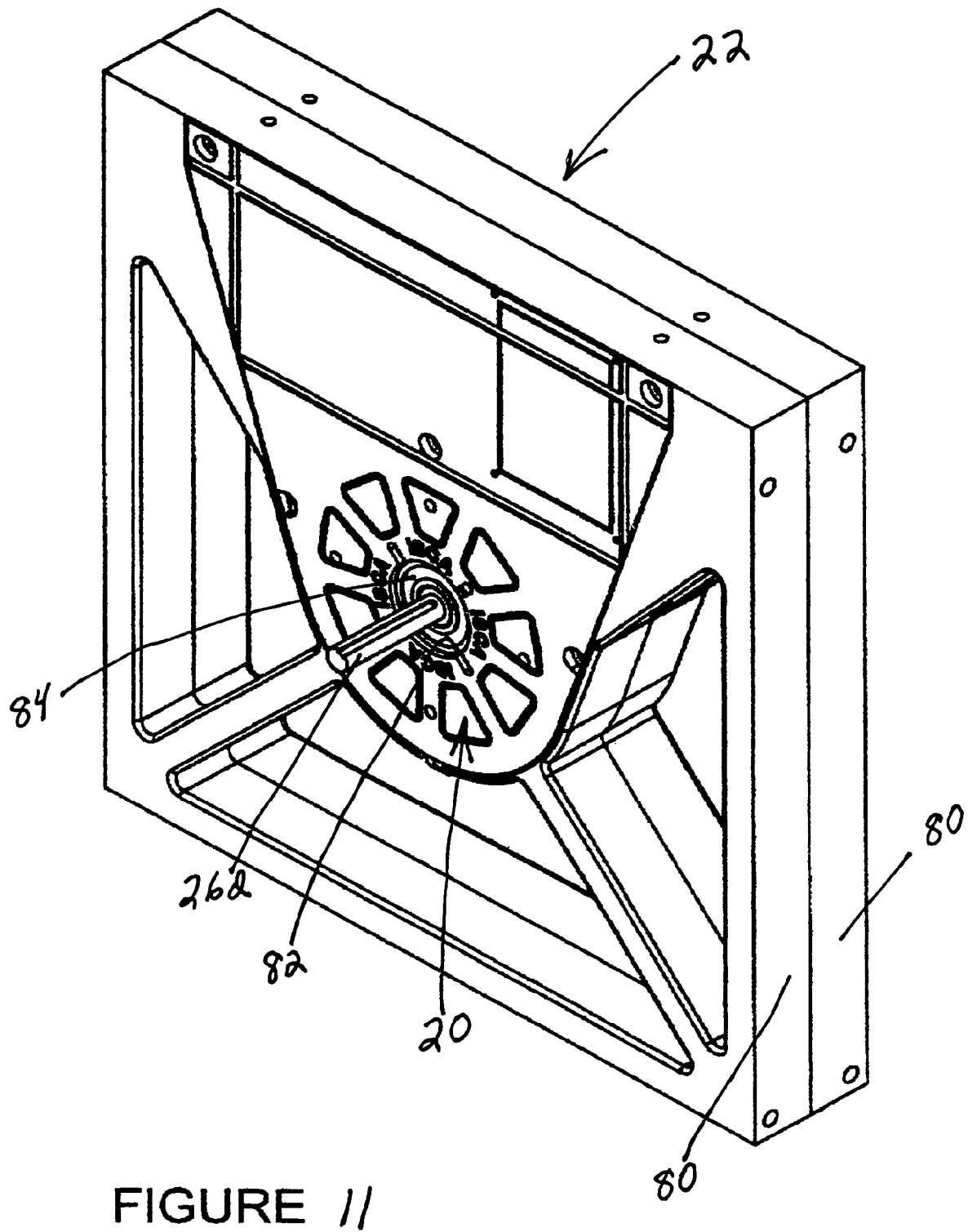
FIG. 11 is a perspective view of the housing for the motor, with the motor positioned therewithin.
Figure 12:
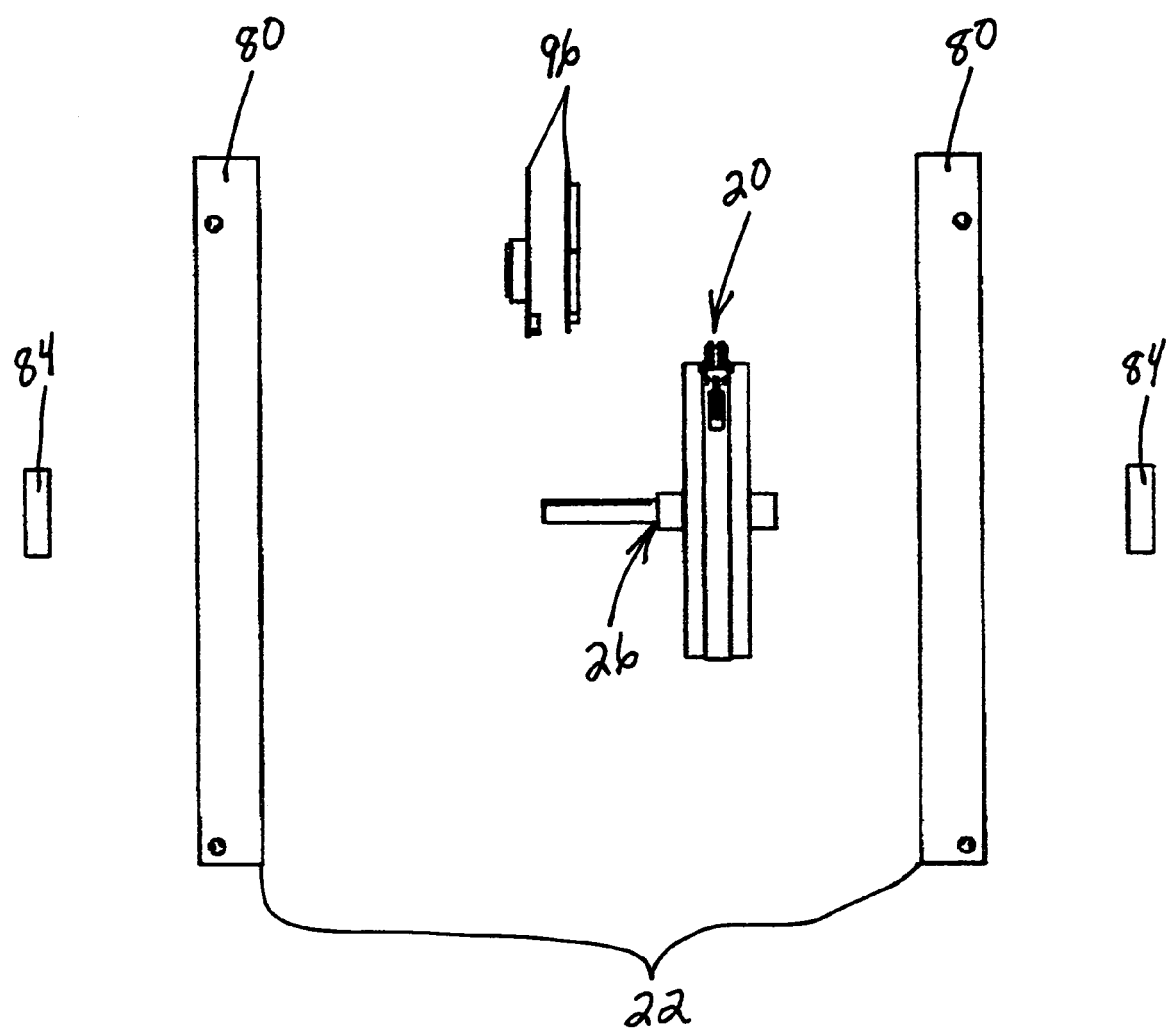
FIG. 12 is an exploded side elevational view of the housing and motor.
Figure 13:
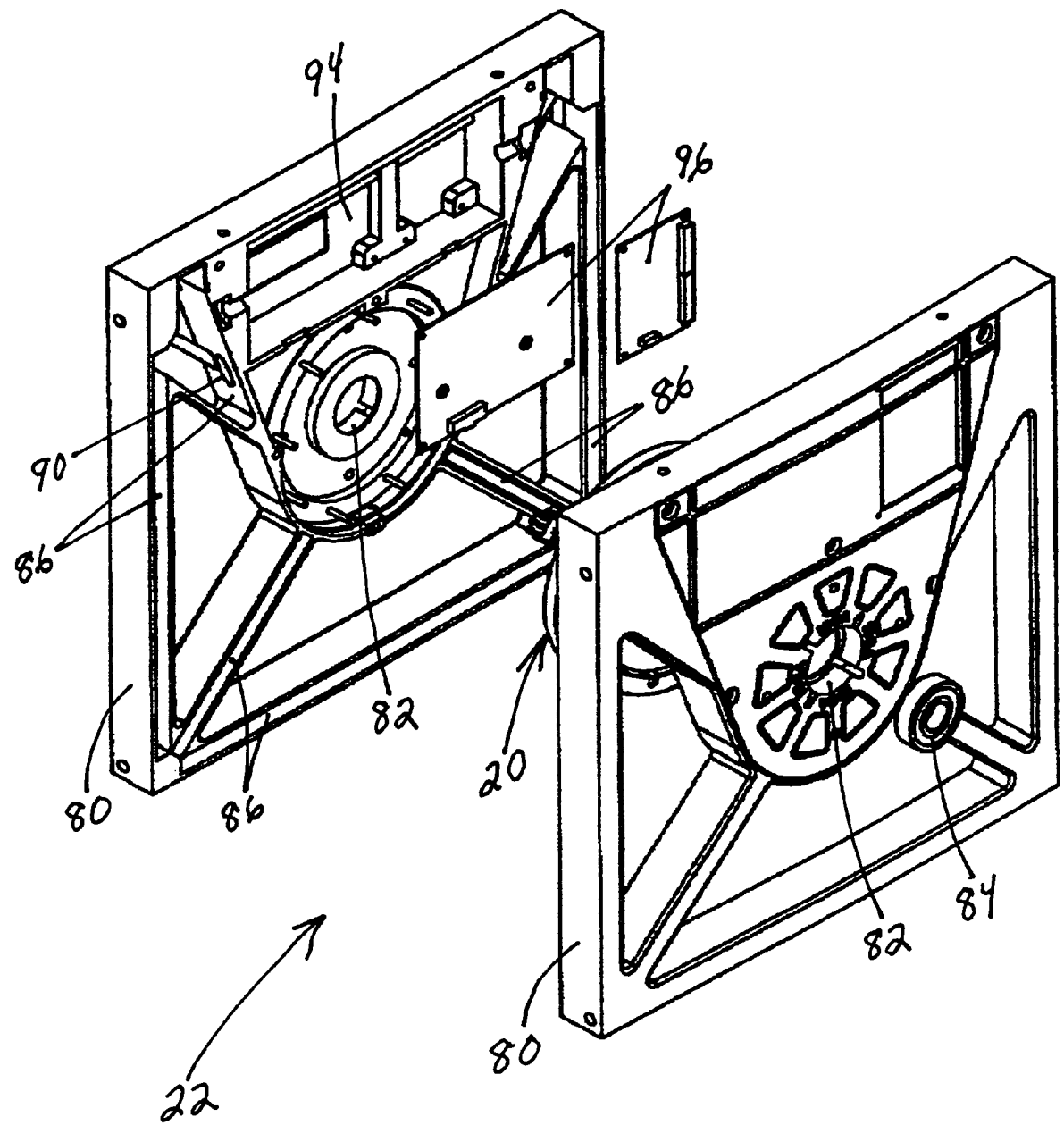
FIG. 13 is an exploded perspective view showing the housing halves separated.

Referring to the drawings in greater detail, and first to FIGS. 1A, 1B, 2A and 2B, the invention is embodied in a brushless electric motor, generally designated 20, which is mountable within a housing, generally designated 22 (FIGS. 11-13). The brushless electric motor includes a pair of disc-shaped end plates, generally designated 24, fixed to the housing in a spaced, generally parallel relationship to each other. A motor shaft, generally designated 26, is rotatably journalled in a pair of bearings 28 mounted in the end plates. A stator assembly, generally designated 30, is fixedly supported by the housing intermediate the end plates and through which the motor shaft passes. A pair of disc-shaped rotor assemblies, generally designated 32, are fixed to the motor shaft and are disposed in opposite sides of stator assembly 30.

Figure 1A:
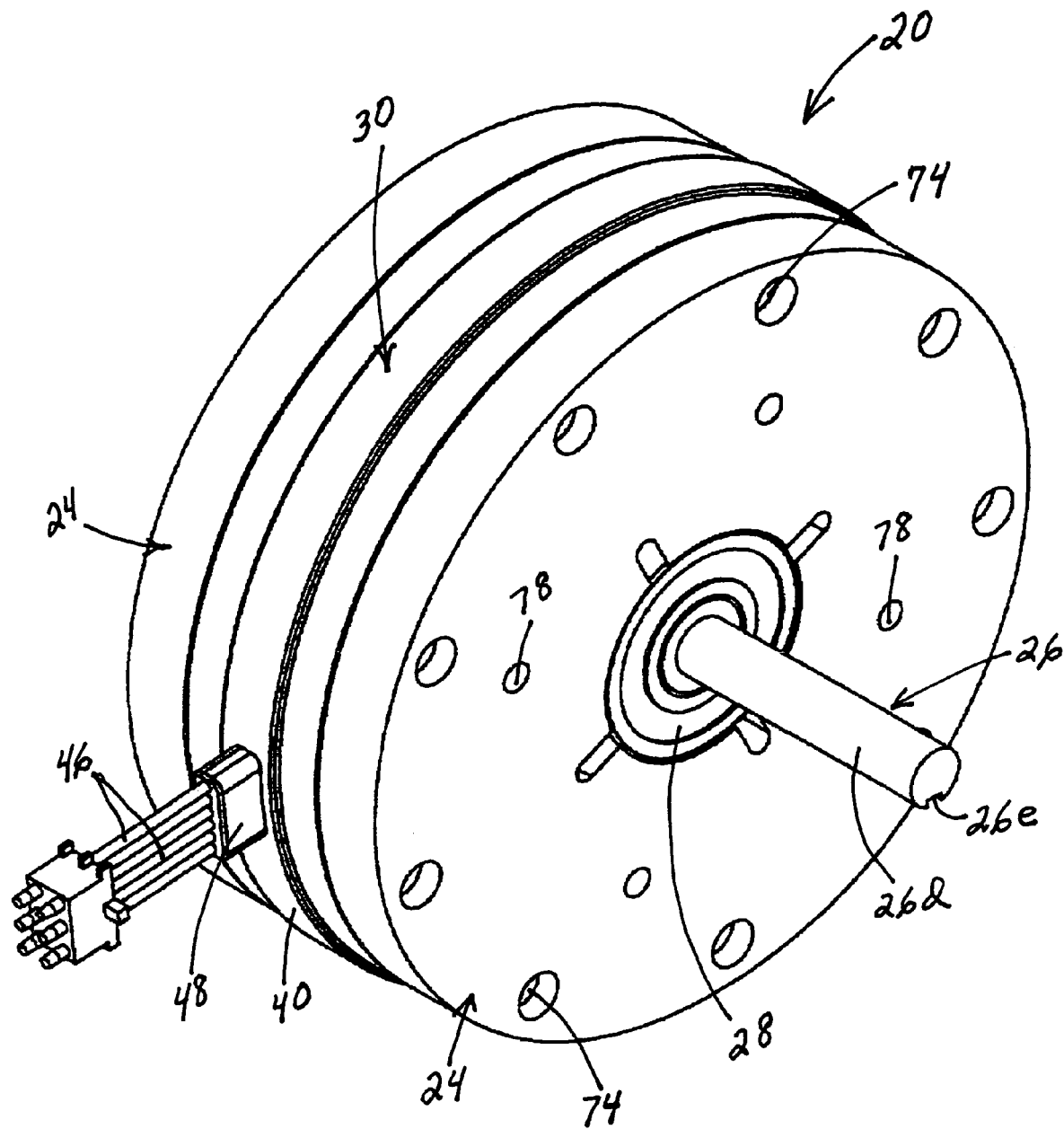
FIGS. 1A and 1B are perspective views of opposite sides of the brushless electric motor according to the invention.
Figure 1B:
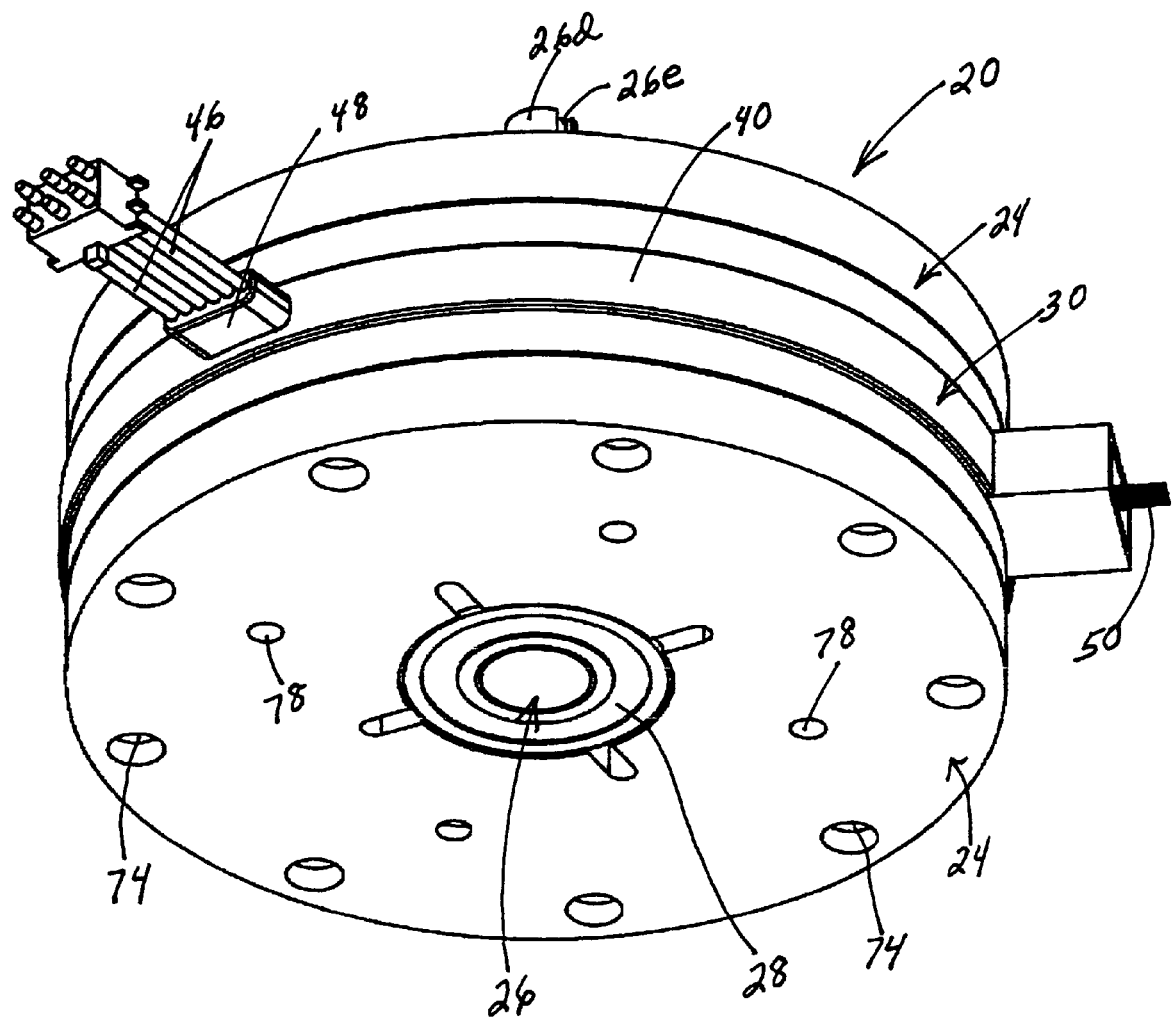
Figure 2A:
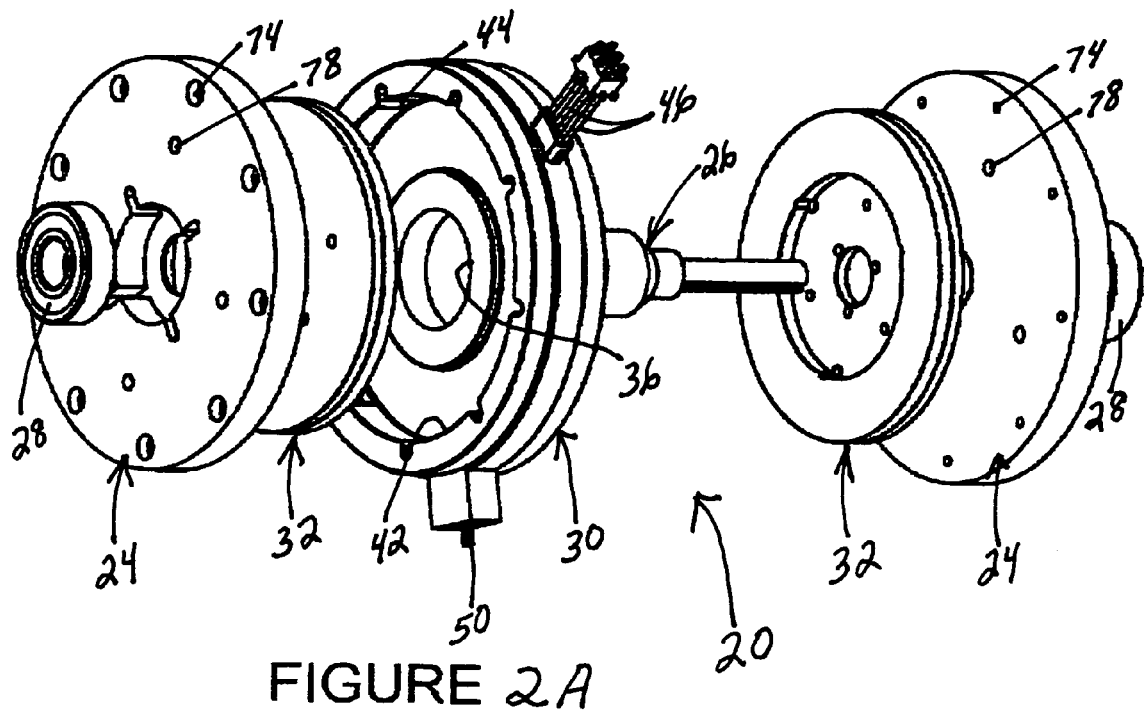
FIGS. 2A and 2B are exploded perspective and side elevational views, respectively, of the motor.
Figure 2B:
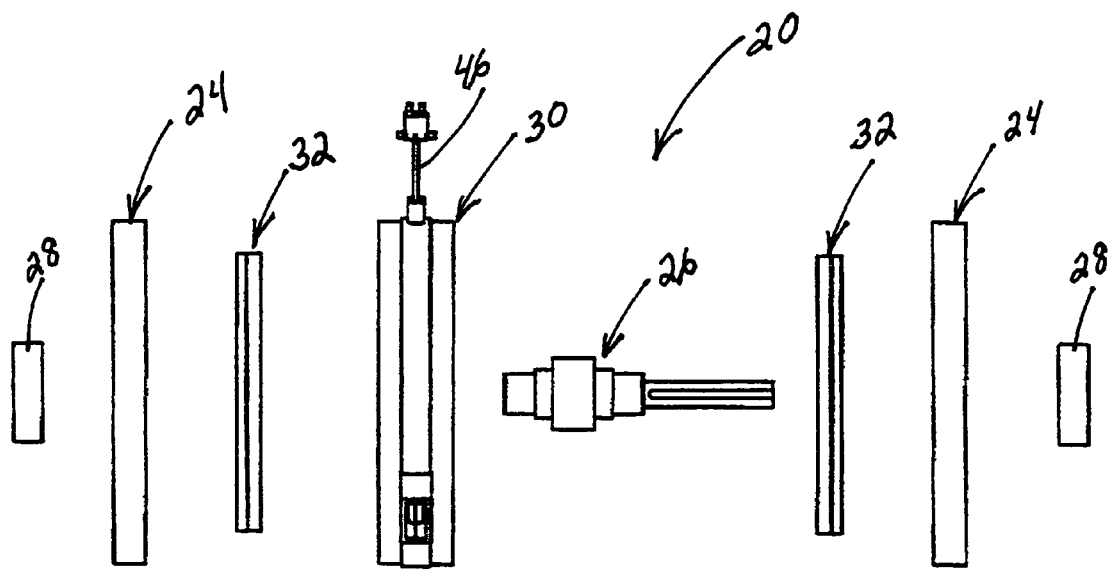
Figure 3A:
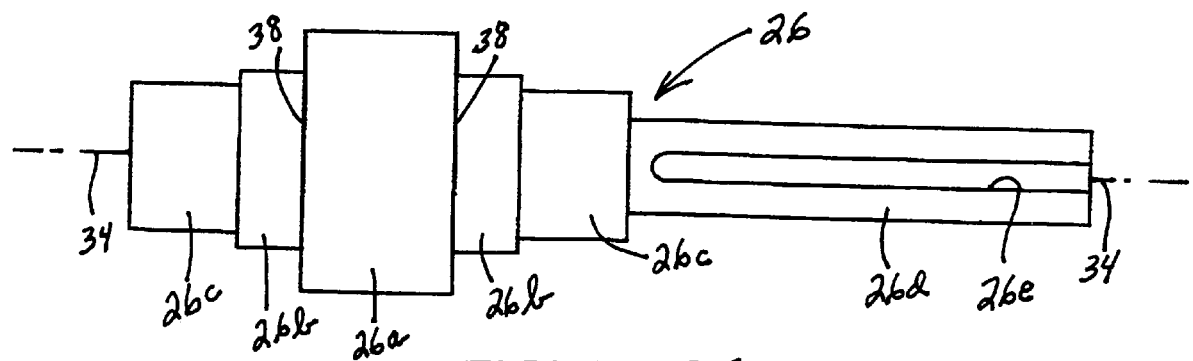
FIGS. 3A, 3B and 3C are side elevational and opposite perspective views, respectively, of the motor shaft.
Figure 3B:
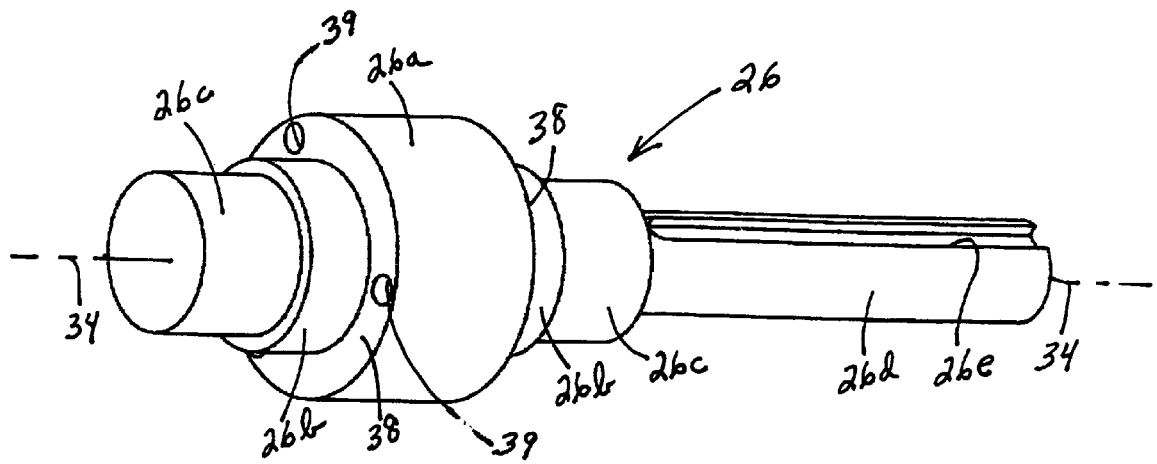
Figure 3C:
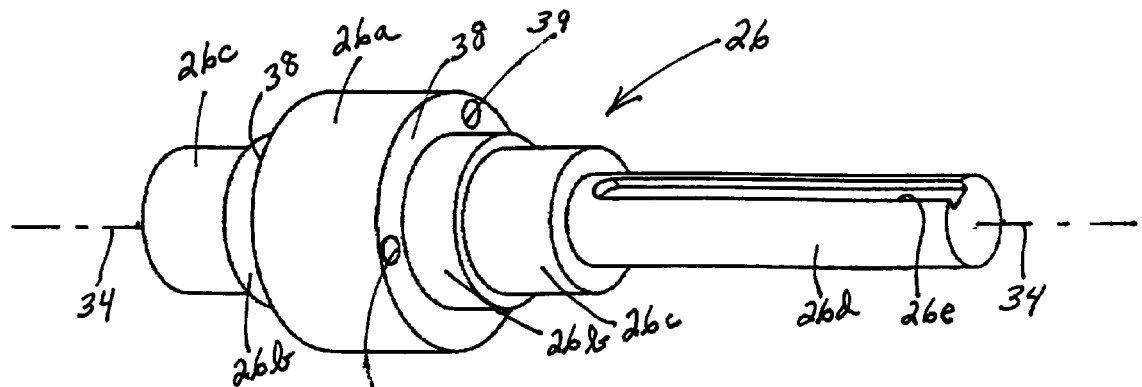

More particularly, referring to FIGS. 3A, 3B and 3C in conjunction with FIGS. 1A-2B, motor shaft 26 includes a stepped configuration including an enlarged diameter hub portion 26a, a pair of lesser diameter mounting portions 26b at opposite sides of the hub portion and a pair of bearing portions 26c of still lesser diameters at opposite sides of mounting portions 26b. A stub shaft portion 26d extends from one end of the motor shaft and has a keyway 26e for mounting an auxiliary component thereon. For instance, an impeller or fan of a ventilation system could be mounted on stub shaft portion 26d. Motor shaft 26 defines an axis of rotation 34 and the outer surfaces of hub portion 26a, mounting portions 26b and bearing portions 26c are circular and concentric about the axis of rotation. When motor shaft 26 is mounted within motor 20, the enlarged diameter hub portion 26a is disposed within a center through hole 36 (FIG. 2A) of stator assembly 30. Rotor assemblies 32 are mounted about mounting portions 26b against a pair of annular, ring-like side surfaces 38 of hub portion 26a. The rotor assemblies are fixed to the motor shaft against surfaces 38 by means of appropriate fasteners, such as bolts, threaded into a plurality of internally threaded holes 39 in surfaces 38 so that the rotor assemblies are conjointly rotatable with motor shaft 26. The motor shaft is journalled within end plates 24 by means of bearing portions 26c of the motor shaft being disposed within bearings 28 in the end plates.

Figure 4:
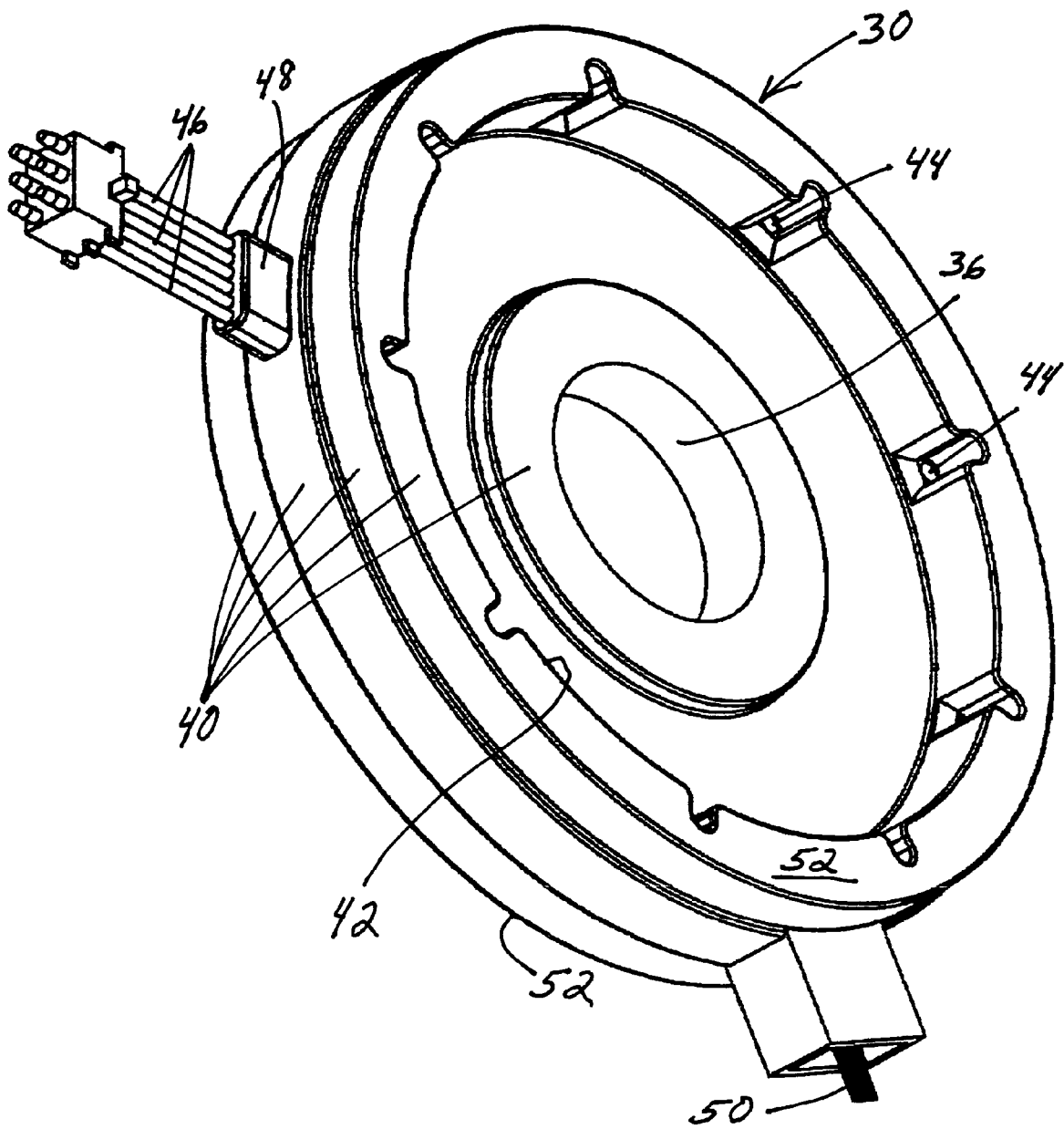
FIG. 4 is a perspective view of one side of the stator assembly, the opposite side being substantially identical.

Referring to FIG. 4 is conjunction with FIGS. 1A-2B, stator assembly 30 is fixed within housing 22 (FIGS. 11-13) and includes the through hole 36 described above within which motor shaft 26 rotates. The stator assembly includes a plastic encasement 40 which completely surrounds a plurality of individual coils, described below. Encasement 40 is a one-piece molded structure of plastic material and has circular recesses 42 in opposite faces thereof. A plurality of mounting holes 44 extend through the encasement about and immediately outside recesses 42. FIG. 4 shows a plurality of lead wires 46 projecting out of an outer periphery of the encasement. As will be seen hereinafter, motor 20 is a three-phase motor, and there are input and output leads 46 for each phase. A strain-relief boss 48 is molded integrally with encasement 40 and through which the leads project. Sensors also may be disposed within the stator assembly, with leads 50 projecting outwardly therefrom. The over-molded encasement 40 can be fabricated exactly and repeatedly by a precision mold. The encasement may be fabricated of a mineral and/or glass fiber filled epoxy molding compound.

Figure 5:
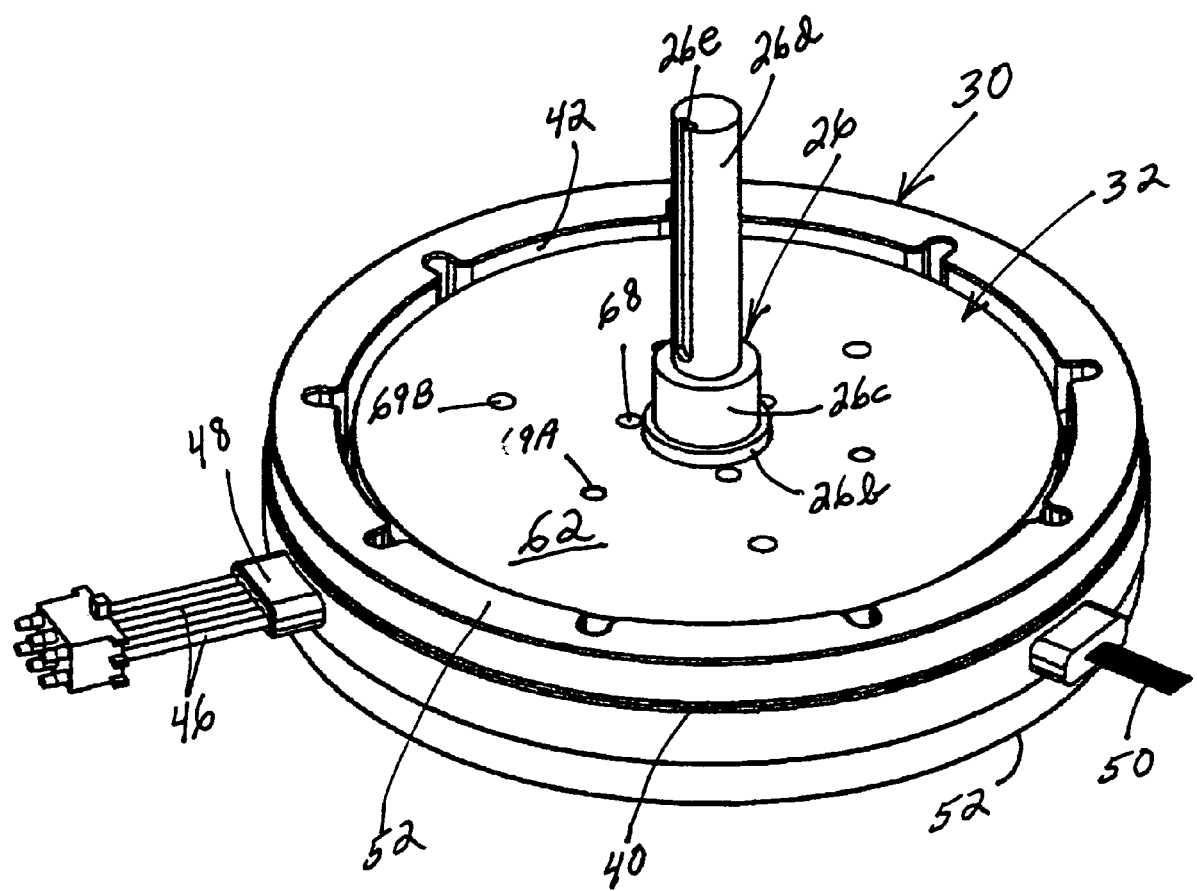
FIG. 5 is a view similar to that of FIG. 4, with the motor shaft and one of the rotor assemblies mounted in the one side of the stator assembly.

FIG. 5 shows a subassembly of motor shaft 26, stator assembly 30 and rotor assembly(ies) 32. It can be seen that the disc-shaped rotor assembly which is fixed to the motor shaft is disposed substantially entirely within the circular recess 42 in the respective face of encasement 40 of the stator assembly. End plates 24 then can be fixed to opposite faces 52 of the stator assembly, as described hereinafter.

Figure 6A:
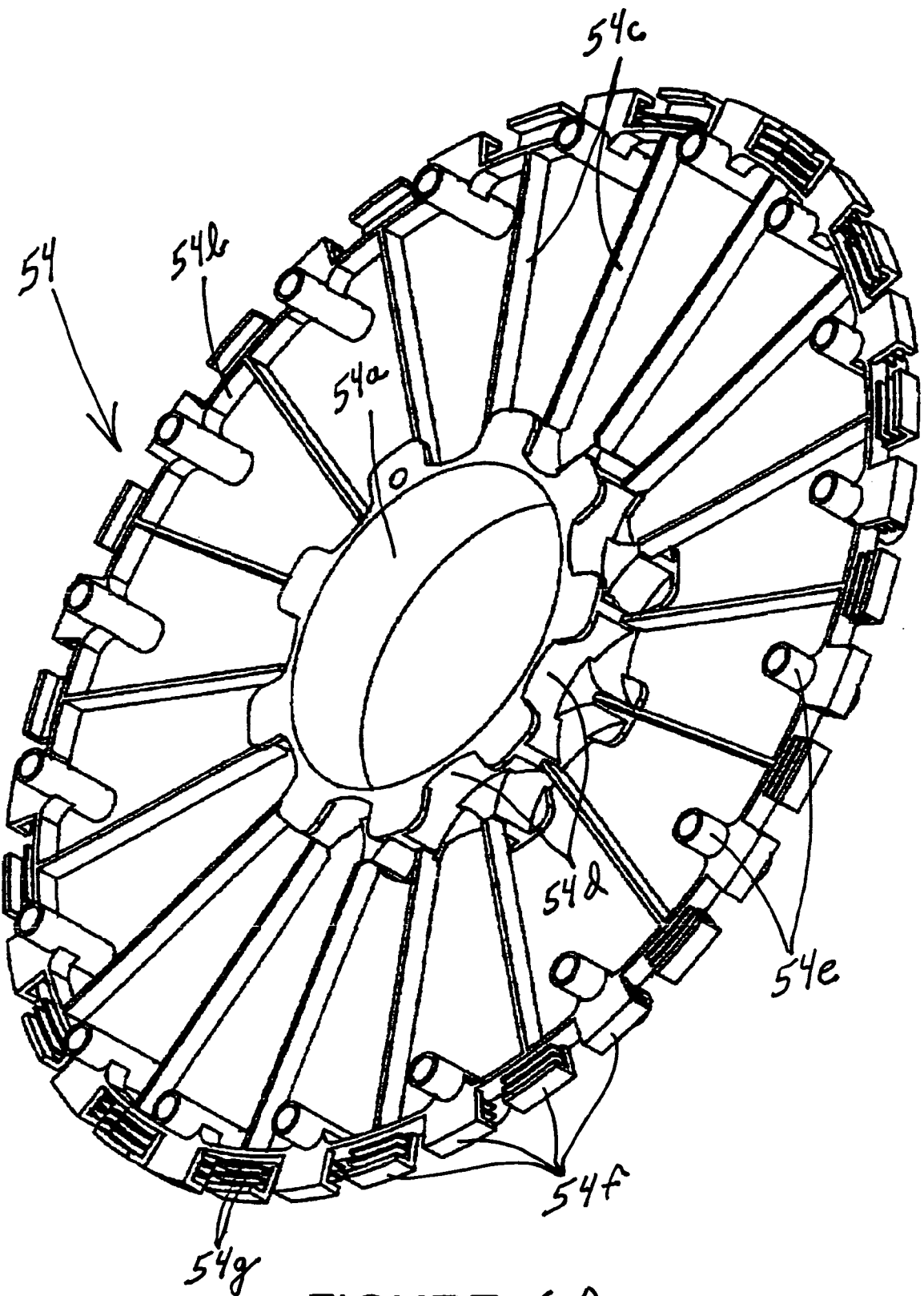
FIGS. 6A, 6B and 6C are perspective, plan and side elevational views, respectively, of the coil-positioning boot used in fabricating the stator assembly.
Figure 6B:
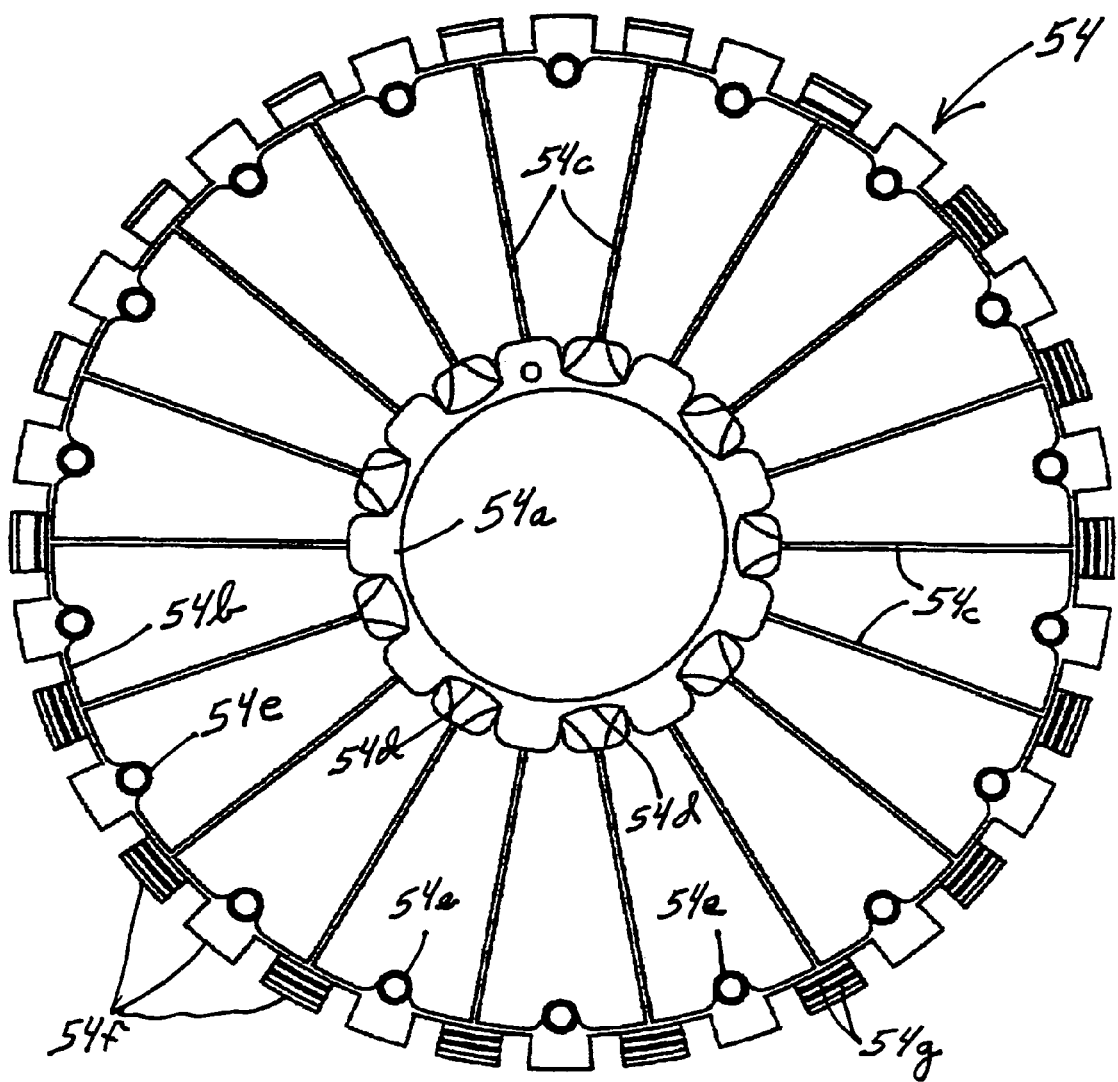
Figure 6C:
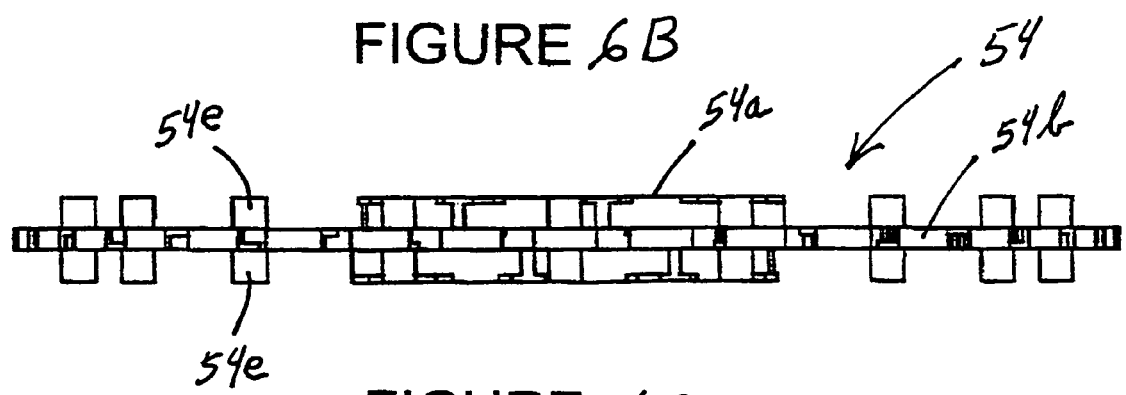

FIGS. 6A, 6B and 6C show a coil-positioning boot, generally designated 54, which is used in fabricating stator assembly 30. Generally, the coil-positioning boot properly positions and spaces the individual wire-wound coils of the stator assembly so that plastic encasement 40 can be over-molded thereabout. Specifically, coil-positioning boot 54 includes a center ring 54a, an outer ring 54b and a plurality of spokes 54c extending between the center ring and the outer ring. The entire boot may be unitarily molded as a one-piece structure of plastic material. Spokes 54c define a plane, and the configuration of the boot on one side of that plane is a mirror image of the boot on the opposite side of that plane. Specifically, a circular array of annular, coil-positioning recesses 54d open radially outwardly around center ring 54a on each opposite side of the plane formed by the spokes. A circular array of coil-positioning posts 54e project generally perpendicular to the plane of the spokes around outer ring 54b, again at both opposite sides of the plane defined by the spokes. A plurality of alternatingly oppositely facing wire management portions 54f project outwardly about the entire outer periphery of outer ring 54b. The wire management portions have grooves 54g within which individual wires extending between the wire-wound coils are positioned or managed.

Figure 7A:
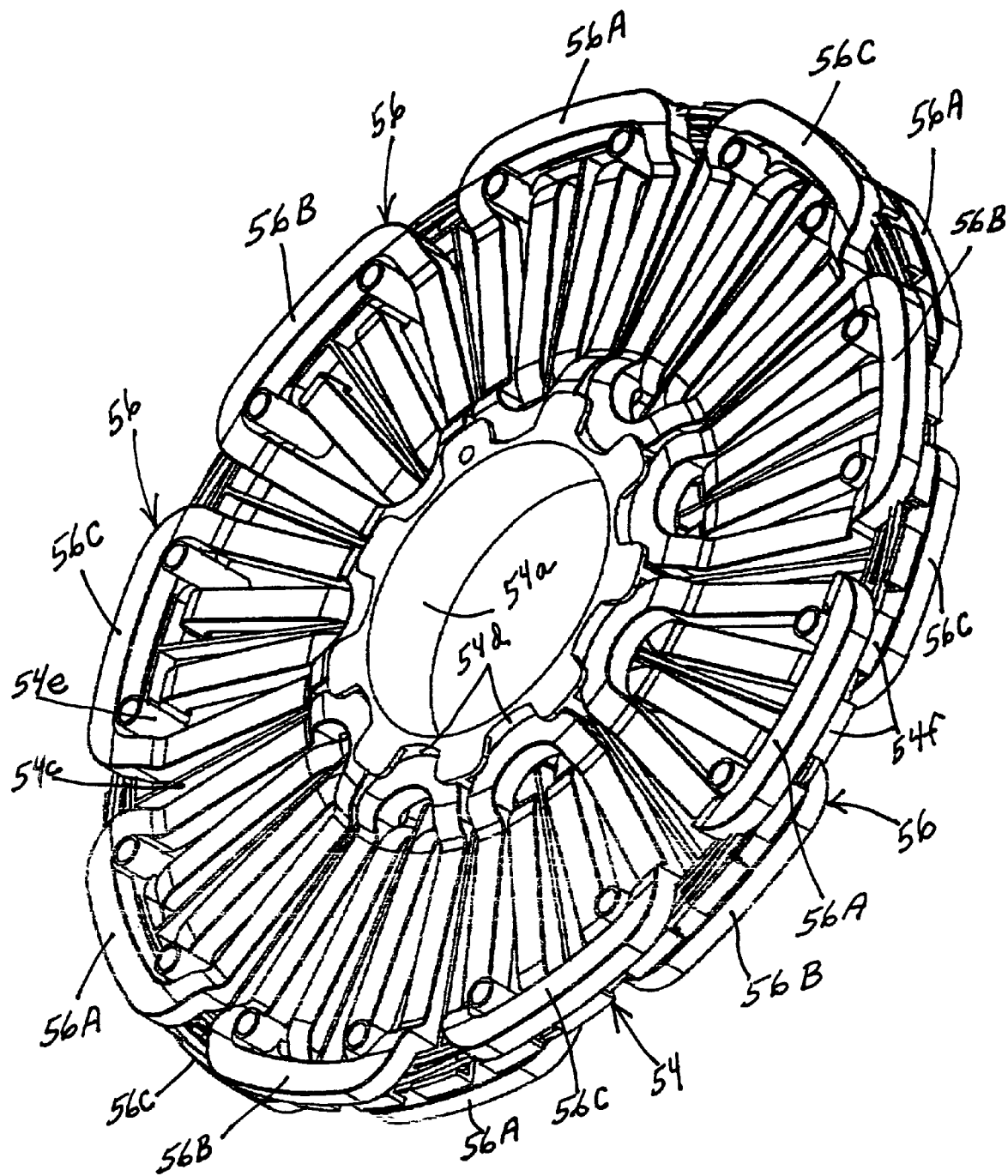
FIGS. 7A, 7B and 7C are perspective, plan and side elevational views, respectively, showing the coils properly positioned on the boot.
Figure 7B:
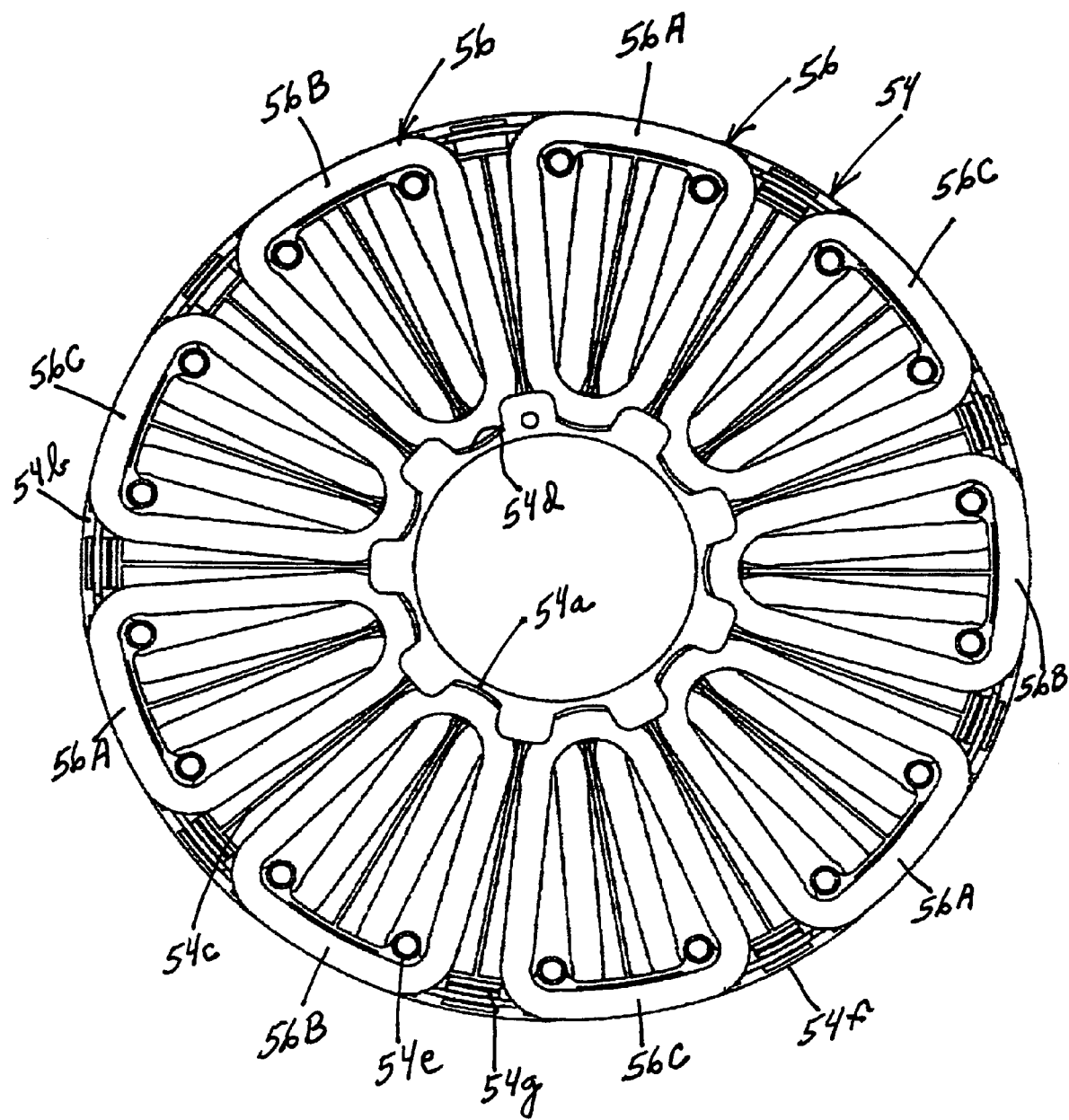
Figure 7C:
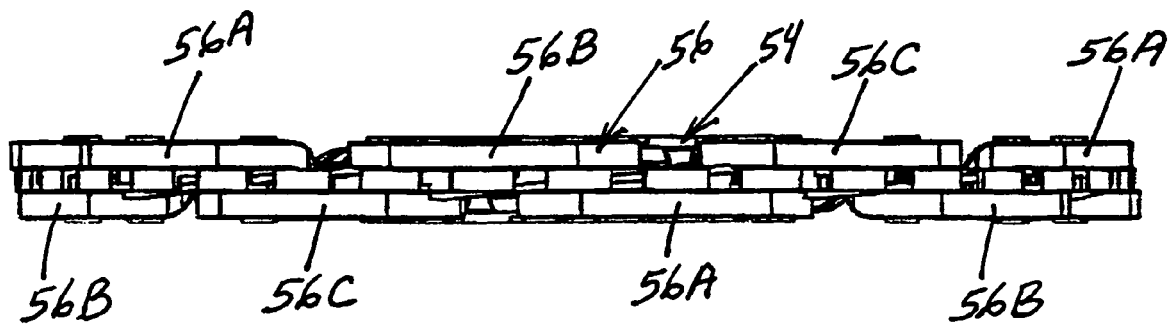

FIGS. 7A, 7B and 7C show a plurality of individual wire-wound coils, generally designated 56, properly positioned and spaced relative to each other by the coil-positioning boot 54. As stated above, motor 20 is a three-phase motor. Therefore, coils 56A represent the coils of one phase of the motor, coils 56B represent a second phase of the motor and coils 56C represent a third phase of the motor. Wires 58 between the individual coils in each phase are positioned, separated and "managed" within grooves 54g of the wire management portions 54f of the coil-positioning boot 54. After coils 56 are properly positioned and spaced about both sides of the coil-positioning boot 54, plastic encasement 40 is over-molded entirely about the array of coils as described above and shown in FIG. 4. The coil-positioning boot 54 remains within the overmolded plastic encasement.

Figure 8:
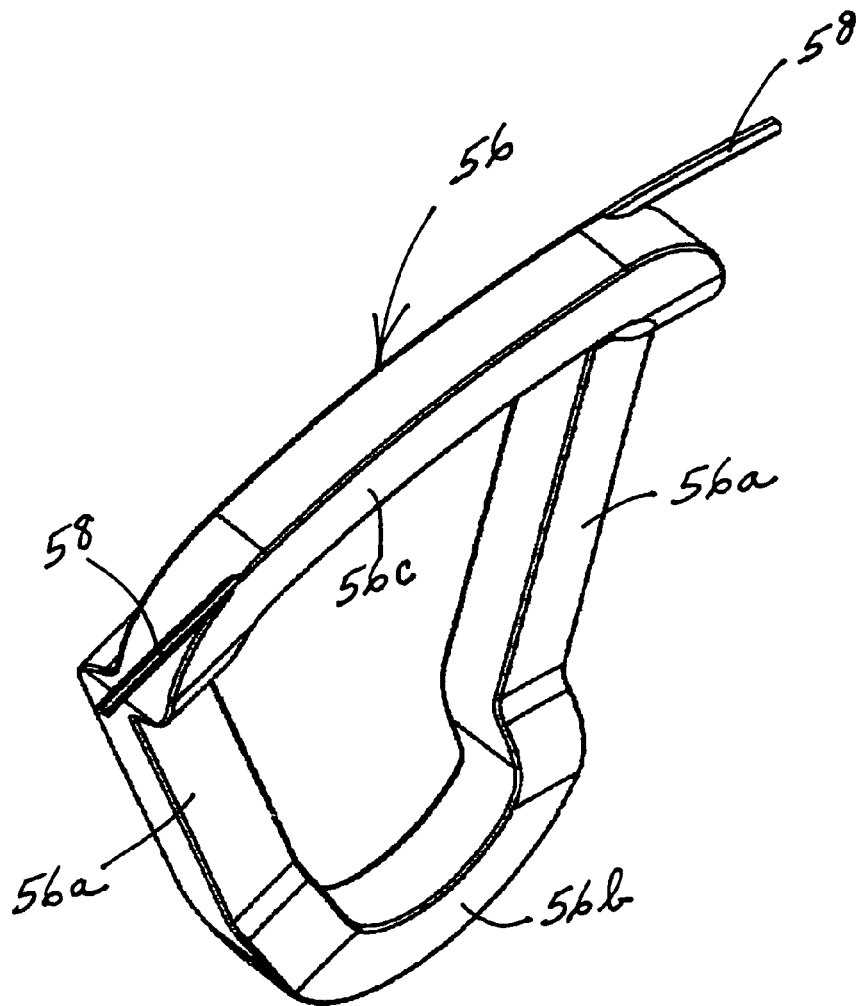
FIG. 8 is a perspective view of one of the individual wire-wound coils.

FIG. 8 shows a single one of the wire-wound coils 56. It can be seen that each coil is generally trapezoidal in shape with radially extending side portions 56a and inner and outer circumferentially extending end portions 56b and 56c, respectively. It also can be seen that side portions 56a are disposed in a common plane offset from end portions 56b and 56c. When all of the individual coils are mounted on and spaced about the coil-positioning boot as shown in FIGS. 7A-7C, the inner circumferentially extending end portions 56b of the coils will be seated within arcuate recesses 54d (FIG. 6A) of the boot, and the outer circumferentially extending end portions 56c of the coils will be positioned about the positioning posts 54e of the boot. When all of the coils are so positioned on opposite sides of the boot, all of the radially extending side portions 56a of all of the coils will be coplanar in the plane defined by spokes 54c of the boot.

Figure 9A:
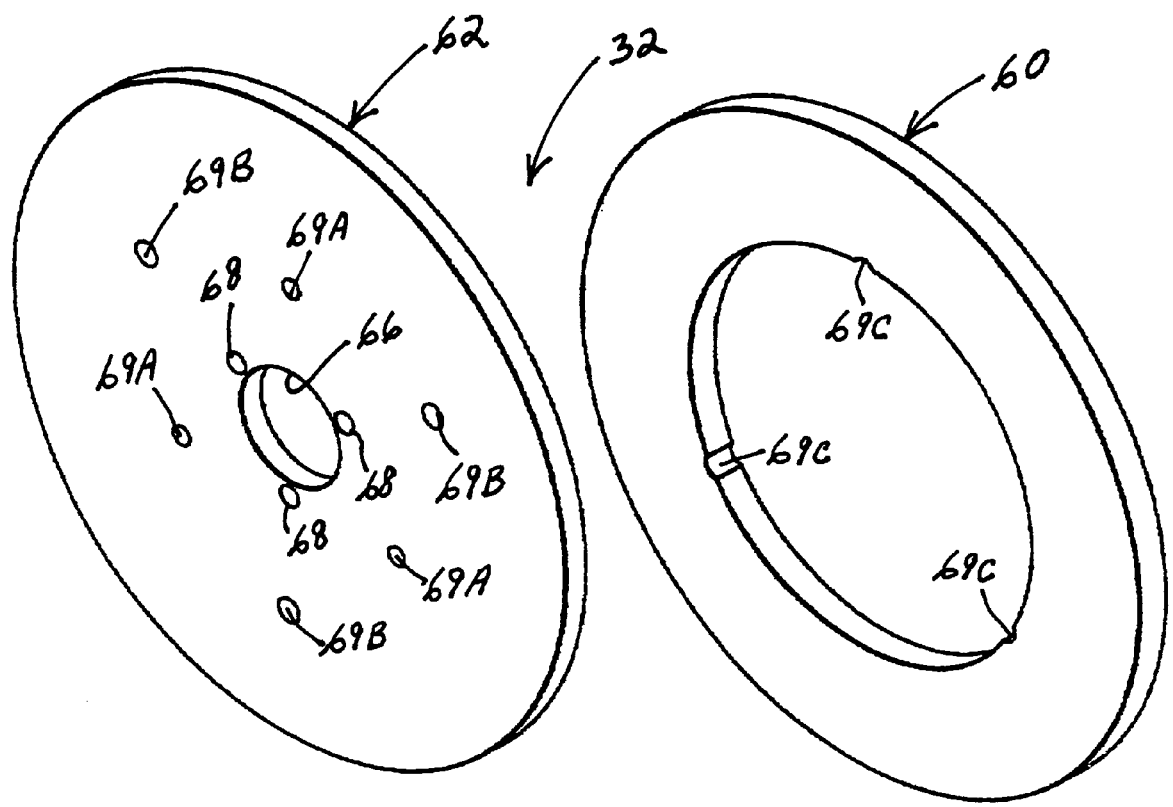
FIGS. 9A, 9B and 9C are exploded perspective, assembled perspective and plan views of one of the rotor assemblies.
Figure 9B:
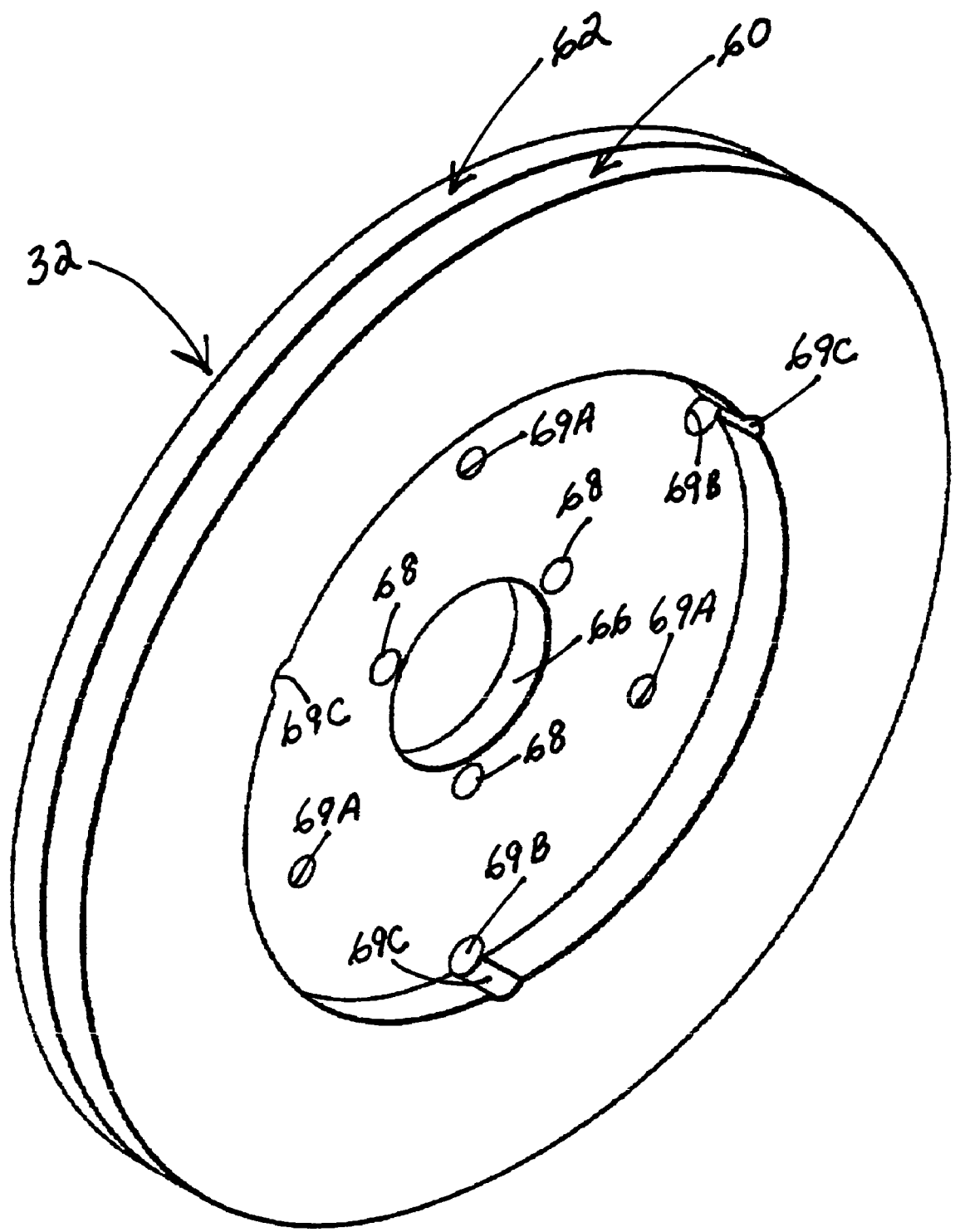
Figure 9C:
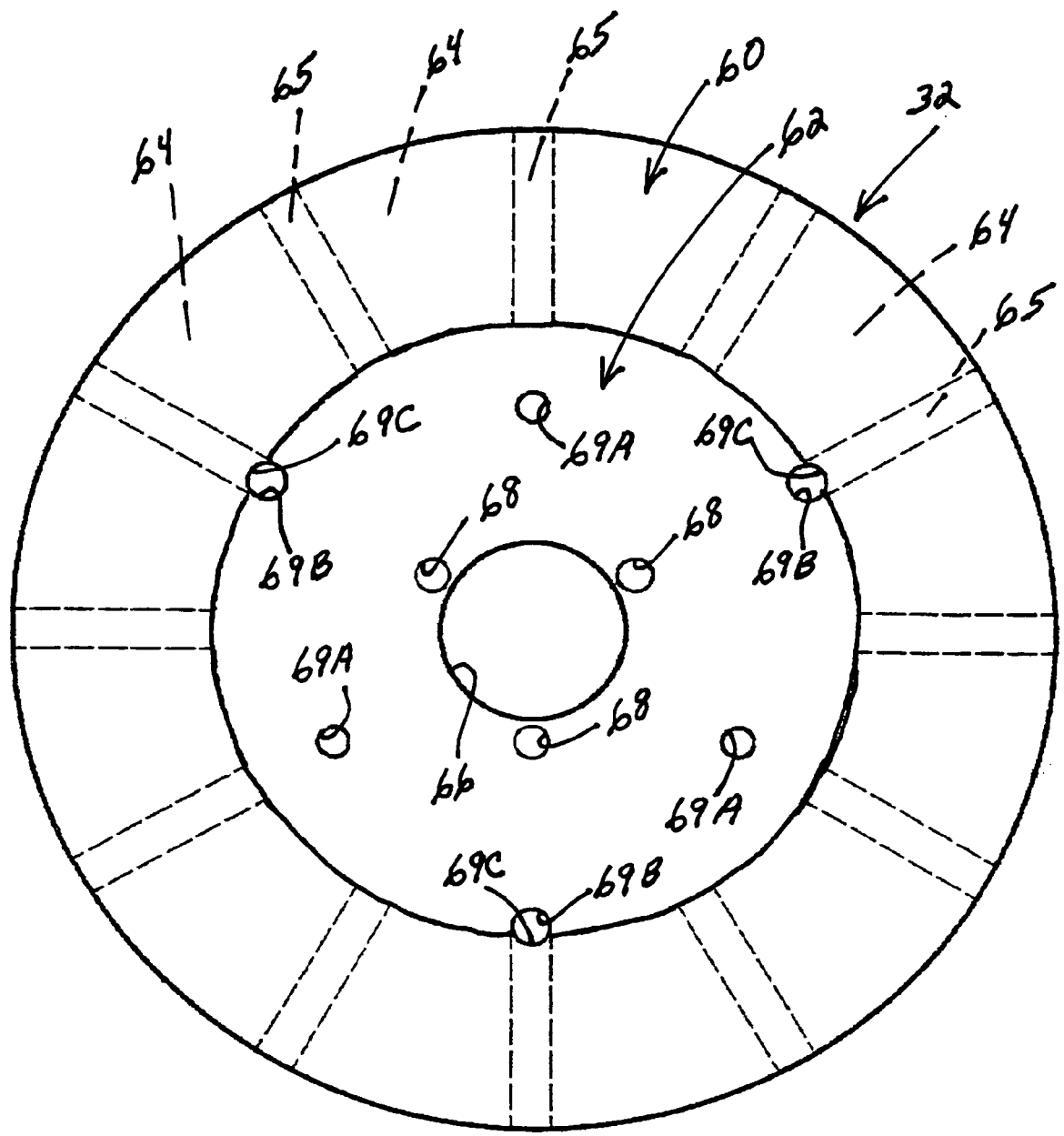

Both of the pair of disc-shaped rotor assemblies 32 which are disposed within recesses 42 in opposite faces of stator assembly 30, are identical. One of the rotor assemblies is shown in FIGS. 9A, 9B and 9C. Each rotor assembly is laminated and includes a magnet disc or ring, generally designated 60, and a flux return disc, generally designated 62.

The flux return disc is fabricated of ferrous material such as steel. Magnet ring 60 is solid and of homogeneous metal material capable of being fabricated into permanent magnets. Specifically, magnet ring 60 is fabricated of a rare earth permanent magnet material or alloy. Neodymium has been used in the preferred embodiment. However, Alnico, Samarium Cobalt or a ceramic material could be used.

To that end, and referring to FIG. 9C, a plurality of permanent magnet sectors 64 of alternating polarity are incited directly into the solid metal material of magnet ring 60. The permanent magnet sectors are in a ring-like pattern and are covered on one side with the flux return disc 62 as the flux return disc is laminated to the magnet disc by an appropriate bonding procedure or material.

More particularly, the rare earth alloys of magnet rings 60 are formed by a powder metallurgical process. The material is cast, compacted or compressed into a body having a ring-shaped cross-section. Because the material is brittle, it cannot be cut with saws or machined like most metals. Consequently, the body is sliced into magnet rings 60 using wires of EDM or ground with an abrasive wheel, using a coolant to minimize heat cracking or chipping. The rings then are coated with an appropriate anti-corrosion sealant, such as zinc or the like.

The coated magnet ring 60 then is bonded to the flux return disc 62 as seen in FIGS. 9B and 9C, by an appropriate adhesive between the facing flat surfaces of the discs. The assembly may be coated, again with an anti-corrosion sealant, to prevent corrosion of the steel flux return disc and to protect the adhesive bond. Bonding the magnet ring to the return disc also allows for proper alignment of the ring onto the return disc which is of steel and can be sized and shaped with precision machining. In fact, this unitary assembly can be spin-balanced before magnetizing. In many applications, balancing is not even necessary.

The unitary magnet ring and return disc assembly now is ready to be magnetized. Specifically, the assembly is placed on a custom magnetizing fixture. The fixture is designed to magnetize multiple poles on a single rare earth ring at the same time. A capacitor discharges through a coil on the magnetizing fixture, aligned with a desired position on the magnet ring corresponding to one of the magnet sectors 64. There is a coil per pole on the fixture for the number of poles desired on any given magnet ring. The capacitors are effective to fire super charges of voltage which excites the metal on the order of thirty times more powerful than a typical ferrous permanent magnet. When complete, there is an auxiliary bond created between the magnet ring and flux return disc due to the attraction of the disc to the magnets.

When magnet ring 60 is magnetized, air gaps 65 (FIG. 9c) are formed between magnet sectors 64. With the magnet sectors being created in the solid material of the magnet ring, a balanced part can be easily formed as the rotor assembly of the motor, because individual or independent magnet components are avoided.

Return disc 62 of each rotor assembly 32 is provided with a plurality of through fixture holes 69A for mounting the disc on an appropriate fixture during bonding of magnet ring 60 to the return disc. The return disc also is provided with a plurality of alignment holes 69B for receiving alignment pins (not shown). Magnet ring 60 has a plurality of alignment recesses 69C which embrace the alignment pins in alignment with the alignment holes 69B in the return disc. The magnet ring can be magnetized using these holes and recesses as reference points, since the magnet sectors cannot be seen visually. For instance, FIG. 9C shows alignment holes 69B and alignment recesses 69C at locations in air gaps 65. That means that North and South magnet sectors will be located on opposite sides of holes 69B and recesses 69C. All of these holes also can function as circulation or air vent holes.

When the motor is assembled, the circular or toroidal array of the individual wire-wound coils 56 of stator assembly 30 will be generally aligned axially with the ring of permanent magnet sectors 64. Rotor assemblies 32 are positioned onto the mounting portions 26b (FIGS. 3A-3C) of motor shaft 26 against annular faces 38 of the motor shaft. The mounting portions of the shaft are located within center holes 66 of the rotor assemblies, and appropriate fasteners or bolts are inserted through holes 68 in return disc 62 and into the internally threaded holes 39 at opposite sides of the hub portion 26a of the shaft.

Figure 10A:
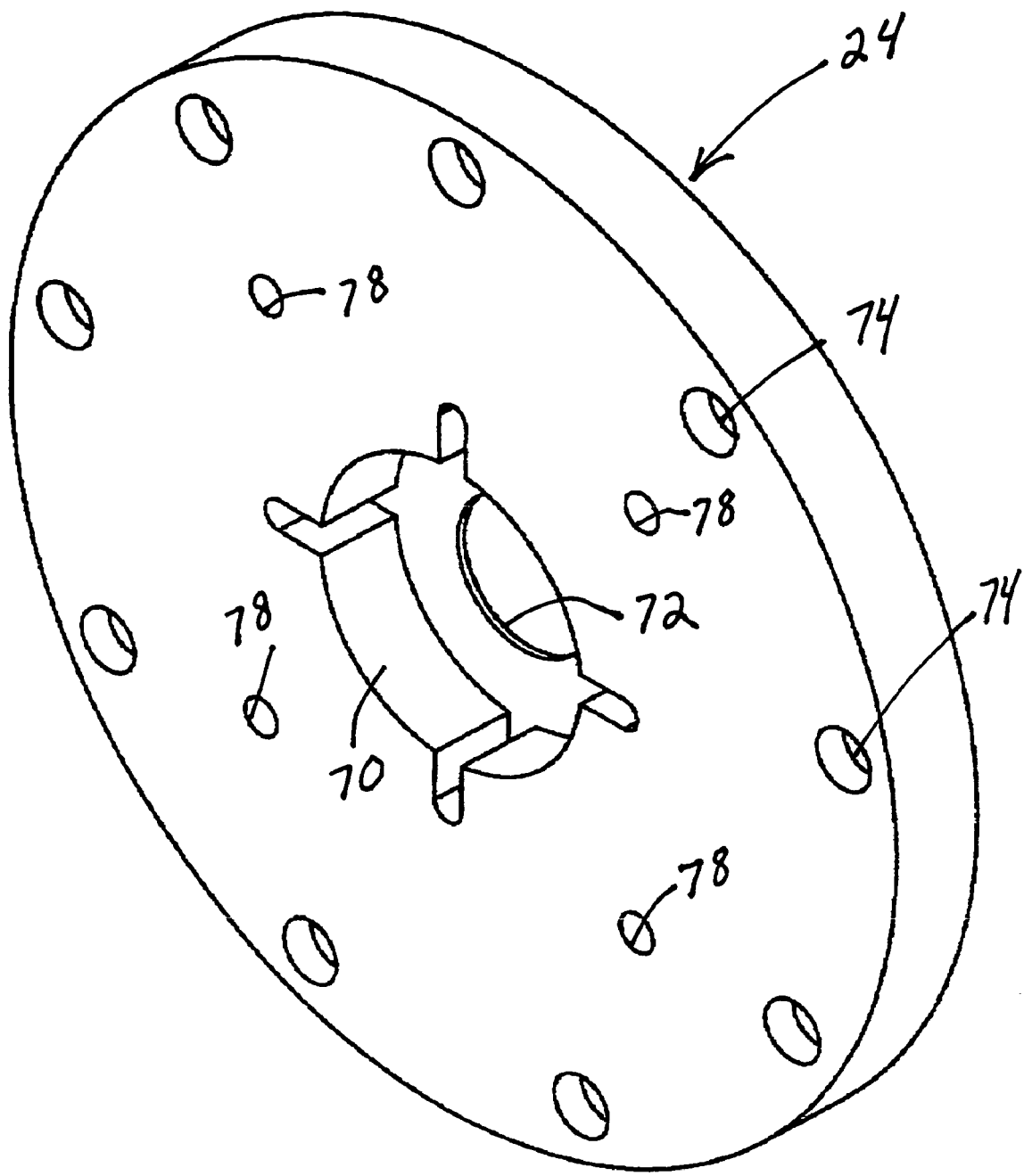
FIGS. 10A and 10B are perspective and side elevational views of one of the end discs.
Figure 10B:
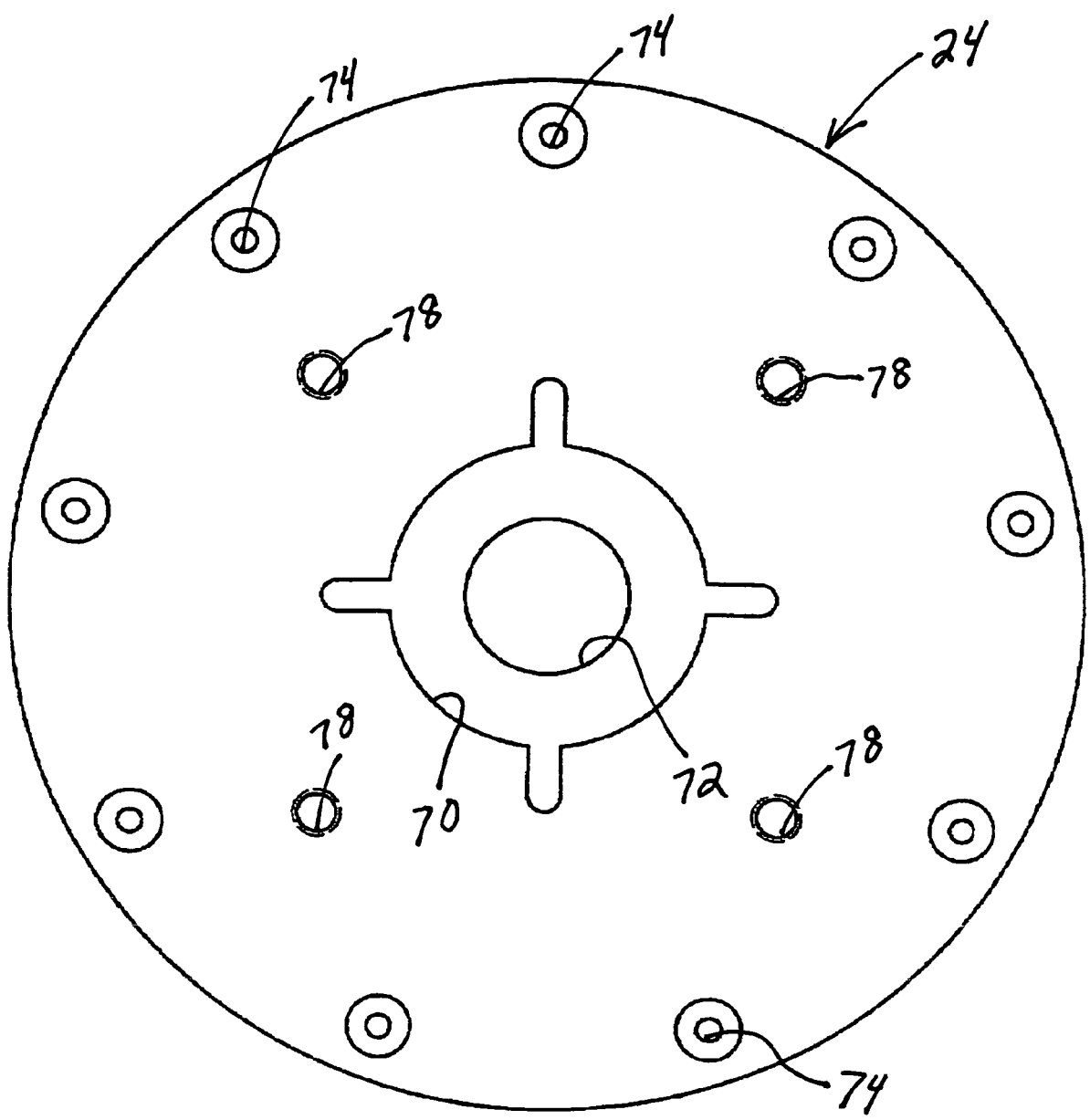

End plates 24 of motor 20 are identical to each other. One of the end plates is shown in FIGS. 10A and 10B. Each end plate is circular and generally disc-shaped. Each end plate has a center, circular, cup-shaped recess 70 in the outside face thereof for receiving a respective one of the bearings 28 which may be press-fit into the recess. The bearing portions 26c of motor shaft 26 extend through holes 72 in the end plates and into bearings 28. The bearing plates have a plurality of mounting holes 74 about the outer periphery thereof for receiving appropriate fasteners to fix the bearing plates to the opposite faces 52 (FIGS. 4 and 5) of the over-molded encasement 40 of stator assembly 20. The fasteners are threaded into holes 44 (FIG. 4) of the encasement. Alternatively, the fasteners could extend entirely through the motor assembly to clamp the end plates against the outer faces of the stator assembly. A plurality of circulation or vent holes 78 are provided in each end plate. The end plates could be fabricated of dielectric or plastic material if there is any possibility that the end plates might engage rotor assemblies 32. On the other hand, as seen in FIG. 5, the rotor assemblies may be recessed within the circular recesses 42 of the stator assembly and not be capable of engaging the end plates, whereby the end plates can be fabricated of sturdy metal material.

Referring to FIGS. 11-13, housing 22 for motor 20 is fabricated as a two-part structure including a pair of very similar if not identical housing halves 80. Each housing half is generally square and includes a center recess 82 for receiving a bearing 84. Bearing portions 26c (FIGS. 3A-3C) of motor shaft 26 are long enough to extend through both the bearings 28 of motor 20 as well as bearings 84 inside the housing. As seen in FIG. 11, stub shaft portion 26d of the motor shaft projects out of the housing for connection to an extraneous component, such as an impeller or fan of a ventilation unit. Housing halves 80 are unitarily molded as one-piece structures fabricated of a thermosetting polyester resin. The plastic material of the housing halves may be impregnated with a fibrous reinforcing material. At least one of the housing halves may include a plurality of mounting pins 85 for insertion through the mounting holes 74 in end plates 24 and through the mounting holes 44 in stator assembly 30.

Figure 14A:
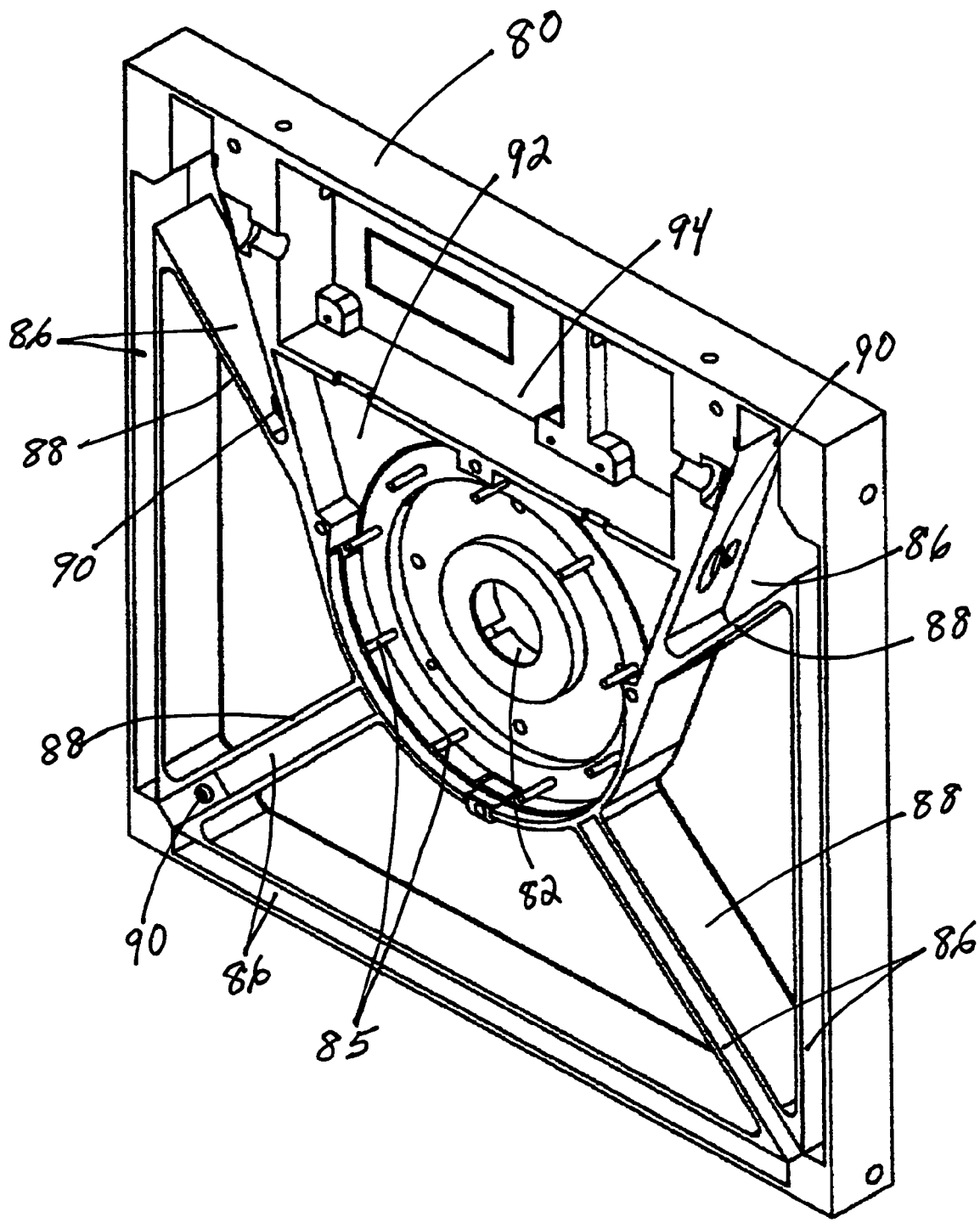
FIGS. 14A and 14B are perspective and side elevational views, respectively, of one of the housing halves.
Figure 14B:
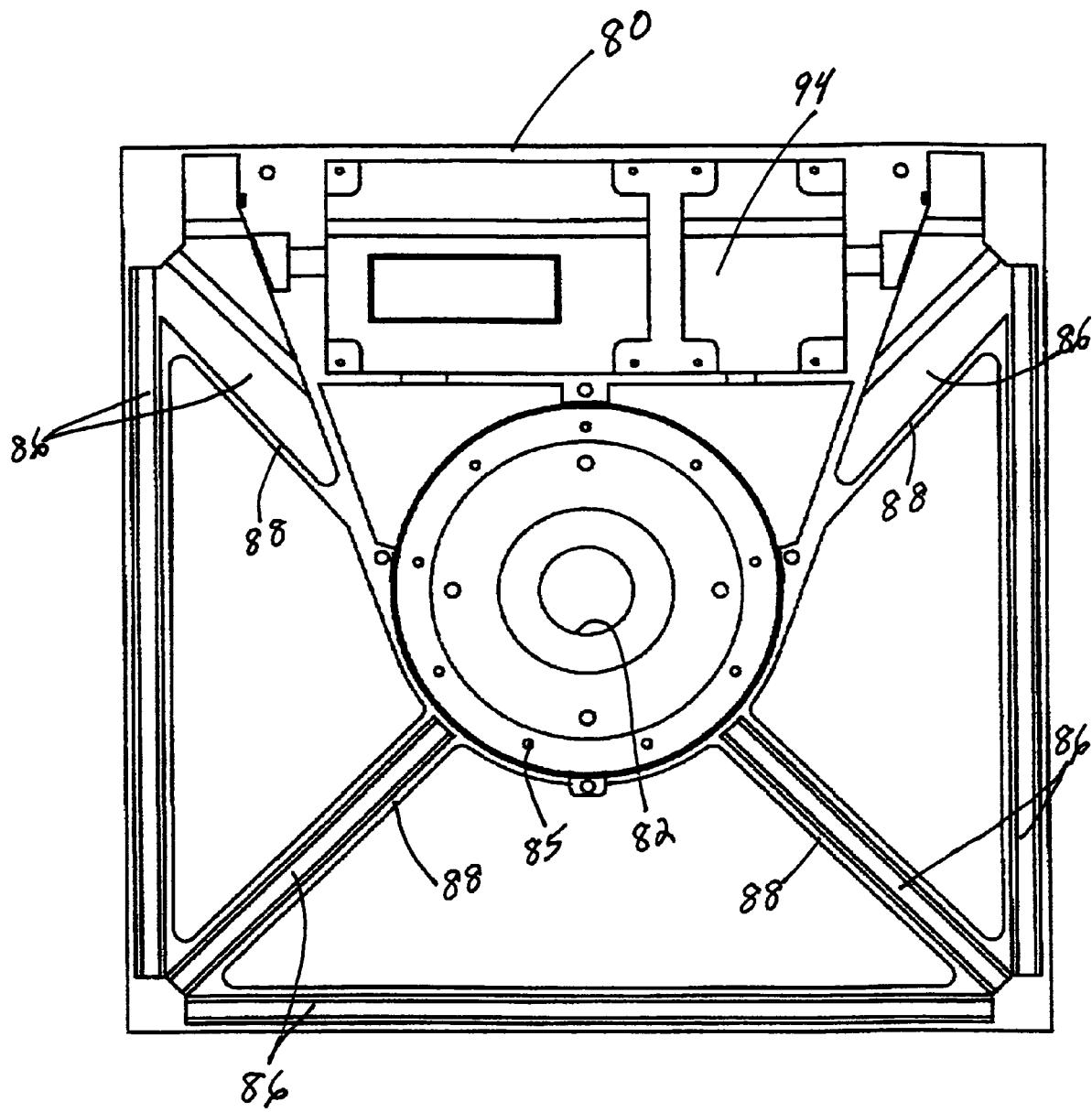

FIGS. 14A and 14B show the inside faces of one of the housing halves 80. One feature of the housing halves being molded of plastic material, is that one or more of the housing halves can be molded with various passages 86 as desired. In the particular configuration, the passages are molded within peripheral sides and within spoke-like components 88 which reinforce the housing halves but which greatly reduce the weight of the overall housing. It is contemplated that the housing halves may be assembled to each other by an impervious seal, and various fluids can flow directly through the passages by providing various apertures or holes 90. For instance, the passages may provide conduits for directly flowing lubricating or cooling fluids to a compartment 92 surrounding the motor. On the other hand, passages 86 may accept auxiliary conduits, piping or tubing for passing the lubricating or cooling fluids therethrough. The housing halves also can be integrally molded with compartments or cavities 94 for receiving control means for the motor. If desired, various plates 96 (FIGS. 12 and 13) can be provided for closing the cavities, if desired.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

The invention claimed is:

1. A brushless electric motor, comprising:
   a housing;
   a pair of disc-shaped end plates fixed relative to the housing in spaced, generally parallel relationship to each other, each end plate having a center recess for receiving a bearing;
   a pair of bearings respectively positioned within the recesses of the end discs;
   a motor shaft rotatably journalled in the bearings in the end plates for rotation about its axis;
   a stator assembly supported by the housing intermediate the end plates and through which the motor shaft passes, the stator assembly including a plurality of individual wire-wound coils in an overlapped toroidal array around the axis of the shaft, an over-molded plastic encasement about the array of coils with wire leads from the coils extending out of the encasement, and the over-molded encasement having circular recesses in opposite faces thereof; and
   a pair of disc-shaped rotor assemblies fixed to the motor shaft and respectively disposed substantially entirely within the circular recesses in the opposite faces of the stator assembly inside the end plates, each rotor assembly being laminated to include a magnet disc and a flux return disc secured to the magnet disc, the magnet disc being solid and of homogeneous metal material with a plurality of permanent magnet sectors of alternating polarity incited directly into the solid metal material of the disc in a ring-like pattern of permanent magnet sectors generally aligned radially with the array of wire wound coils of the stator assembly.

2. The brushless electric motor of claim 1 wherein said pair of disc-shaped end plates are secured to the opposite faces of the encasement of the stator assembly.

3. The brushless electric motor of claim 1 wherein said center recesses in the end plates are cup-shaped for seating the bearings therewithin.

4. The brushless electric motor of claim 3 wherein said cup-shaped recesses are located in outside faces of the end plates.

5. The brushless electric motor of claim 1 wherein said shaft projects through at least one of said end plates.

6. The brushless electric motor of claim 1 wherein said shaft has an enlarged diameter hub portion journalled within the stator assembly, with the rotor assemblies located on opposite sides of the hub portion.

7. The brushless electric motor of claim 5 wherein said rotor assemblies are fixed to the opposite sides of the hub portion of the shaft.

8. The brushless electric motor of claim 1 wherein said pair of disc-shaped end plates are secured to the opposite faces of the encasement of the stator assembly, and the wire leads from the coils of the stator assembly project from a peripheral edge of the encasement of the stator assembly.

9. The brushless electric motor of claim 1 wherein the circular recesses in the outer faces of the encasement of the stator assembly have depths at least as great as the thickness of the disc-shaped rotor assemblies.

10. The brushless electric motor of claim 9 wherein said pair of disc-shaped end plates are secured to the opposite faces of the encasement of the stator assembly.

11. The brushless electric motor of claim 1 wherein the over-lapped coils of said stator assembly are generally trapezoidal in shape with radially extending side portions and circumferentially extending end portions, with the side portions being generally coplanar.

12. The brushless electric motor of claim 1 wherein the flux return discs of said rotor assemblies are fabricated of ferrous material.

13. The brushless electric motor of claim 1 wherein said stator assembly includes a coil-positioning boot on which the wire-wound coils are properly positioned and spaced prior to over-molding the plastic encasement thereabout, the boot remaining within the encasement after overmolding.

14. The brushless electric motor of claim 13 wherein said coil-positioning boot includes wire management portions for positioning individual wires extending between the wire-wound coils.

15. The brushless electric motor of claim 13 wherein said coil-positioning boot includes a plurality of positioning projections about which the wire-wound coils are positioned.

16. The brushless electric motor of claim 1 wherein said housing is fabricated of plastic material.

17. The brushless electric motor of claim 16 wherein said housing is fabricated of a thermosetting polyester resin.

18. The brushless electric motor of claim 16 wherein said plastic housing includes passage means for circulating lubricating or cooling fluids.

19. The brushless electric motor of claim 16 wherein said plastic housing is impregnated with a fibrous reinforcing material.

20. The brushless electric motor of claim 16 wherein said plastic housing includes at least one cavity for receiving control means for the motor.

21. A brushless electric motor, comprising:
   a housing;
   a pair of end plates fixed relative to the housing in spaced, generally parallel relationship to each other;
   a pair of bearings respectively positioned on the end discs;
   a motor shaft rotatably journalled in the bearings on the end plates for rotation about its axis;
   a stator assembly supported by the housing intermediate the end plates and through which the shaft passes, the stator assembly including a plurality of individual wire-wound coils in a toroidal array around the axis of the shaft, and the stator assembly having recesses in opposite faces thereof; and
   a pair of disc-shaped rotor assemblies fixed to the motor shaft and respectively disposed within the circular recesses in the opposite faces of the stator assembly inside the end plates, each rotor assembly being laminated to include a magnet disc and a flux return disc secured to the magnet disc, the magnet disc being solid and of homogeneous metal material with a plurality of permanent magnet sectors of alternating polarity incited directly into the solid metal material of the disc in a ring-like pattern of permanent magnet sectors generally aligned radially with the array of wire wound coils of the stator assembly.

22. The brushless electric motor of claim 21 wherein said shaft projects through at least one of said end plates.

23. The brushless electric motor of claim 21 wherein said shaft has an enlarged diameter hub portion journalled within the stator assembly, with the rotor assemblies located on opposite sides of the hub portion.

24. The brushless electric motor of claim 23 wherein said rotor assemblies are fixed to the opposite sides of the hub portion of the shaft.

25. The brushless electric motor of claim 21 wherein the recesses in the outer faces of the stator assembly have depths at least as great as the thickness of the disc-shaped rotor assemblies.

26. The brushless electric motor of claim 21 wherein the over-lapped coils of said stator assembly are generally trapezoidal in shape with radially extending side portions and circumferentially extending end portions, with the side portions being generally coplanar.

27. The brushless electric motor of claim 21 wherein the return discs of said rotor assemblies are fabricated of ferrous material.

28. A brushless electric motor, comprising:
a housing;
a pair of end plates fixed relative to the housing in spaced, generally parallel relationship to each other;
a pair of bearings respectively positioned on the end discs;
a shaft rotatably journalled in the bearings on the end plates for rotation about its axis;
a stator assembly supported by the housing intermediate the end plates and through which the shaft passes, the stator assembly including a plurality of individual wire-wound coils in a toroidal array around the axis of the shaft, an over-molded plastic encasement about the array of coils with wire leads from the coils extending out of the encasement, and the encasement having circular recesses in opposite faces thereof; and
a pair of disc-shaped rotor assemblies fixed to the motor shaft and respectively disposed substantially entirely within the circular recesses in the opposite faces of the stator assembly inside the end plates.

29. The brushless electric motor of claim 28 wherein said pair of disc-shaped end plates are secured to the opposite faces of the encasement of the stator assembly.

30. The brushless electric motor of claim 28 wherein the circular recesses in the outer faces of the encasement of the stator assembly have depths at least as great as the thickness of the disc-shaped rotor assemblies.

31. The brushless electric motor of claim 30 wherein said pair of disc-shaped end plates are secured to the opposite faces of the encasement of the stator assembly.

32. The brushless electric motor of claim 28 wherein the over-lapped coils of said stator assembly are generally trapezoidal in shape with radially extending side portions and circumferentially extending end portions, with the side portions being generally coplanar.

33. The brushless electric motor of claim 28 wherein said stator assembly includes a coil-positioning boot on which the wire-wound coils are properly positioned and spaced prior to over-molding the plastic encasement thereabout, the boot remaining within the encasement after overmolding.

34. The brushless electric motor of claim 33 wherein said coil-positioning boot includes wire management portions for positioning individual wires extending between the wire-wound coils.

35. The brushless electric motor of claim 33 wherein said coil-positioning boot includes a plurality of positioning projections about which the wire-wound coils are positioned.

36. A stator assembly for a brushless electric motor, comprising:
a plurality of individual wire-wound coils;
a coil-positioning boot on which the coils are properly positioned and spaced in a predetermined array; and
a plastic encasement over-molded substantially entirely about the array of coils and the boot to maintain the proper positioning and spacing of the coils in the predetermined array.

37. The stator assembly of claim 36 wherein said coil-positioning boot includes wire management portions for positioning individual wires extending between the wire-wound coils.

38. The stator assembly of claim 36 wherein said coil-positioning boot includes a plurality of positioning projections about which the wire-wound coils are positioned.

39. The stator assembly of claim 36 wherein said individual wire-wound coils are positioned on the boot in an overlapped toroidal array around a center axis of the stator assembly.

40. The stator assembly of claim 36 wherein wire leads from said wire wound coils extend out of the encasement at an outer periphery thereof.

41. The stator assembly of claim 36 wherein said encasement includes circular recesses in opposite faces thereof for receiving a pair of disc-shaped rotors on opposite sides of the stator assembly.

42. A method of fabricating a stator assembly for a brushless electric motor, comprising:
winding a plurality of individual wire-wound coils;
providing a coil-positioning boot;
properly positioning the coils on the boot in a spaced, predetermined array; and
over-molding a plastic encasement substantially entirely about the array of coils and the boot to maintain the proper positioning and spacing of the coils in the predetermined array.

43. The method of claim 42, including the step of electrically connecting individual wires extending between the wire-wound coils after the coils are positioned on the boot.

44. The method of claim 42, including providing the coil-positioning boot with wire management portions, and positioning individual wires extending between the wire-wound coils on the wire management portions of the boot.

45. The method of claim 44, including the step of electrically connecting the individual wires extending between the coils, with the connected wires positioned on the wire management portions of the boot.

46. The method of claim 42, including providing the coil-positioning boot with a plurality of positioning projections, with the wire-wound coils properly positioned about the projections.

47. The method of claim 42, including positioning the individual wire-wound coils on the coil-positioning boot in an overlapped toroidal array around a center axis of the stator assembly.

48. The method of claim 42 wherein said plastic encasement is over-molded about the wire-wound coils with wire leads from the coils extending out of the encasement at an outer periphery thereof.

49. The method of claim 42 wherein said plastic encasement is over-molded with recesses in opposite faces thereof for receiving a pair of appropriate rotors of the electric motor.

* * * * *